(12) United States Patent
Palma et al.

(10) Patent No.: US 11,317,028 B2
(45) Date of Patent: Apr. 26, 2022

(54) CAPTURE AND DISPLAY DEVICE

(71) Applicant: Appsure Inc., Monroe Township, NJ (US)

(72) Inventors: Sergio Palma, Middle Village, NY (US); Daniel Palma, Monroe Township, NJ (US)

(73) Assignee: Appsure Inc., Monroe Township, NJ (US)

( * ) Notice: Subject to any disclaimer, the term of this patent is extended or adjusted under 35 U.S.C. 154(b) by 236 days.

(21) Appl. No.: 15/863,714

(22) Filed: Jan. 5, 2018

(65) Prior Publication Data

US 2018/0198984 A1    Jul. 12, 2018

Related U.S. Application Data

(60) Provisional application No. 62/443,454, filed on Jan. 6, 2017.

(51) Int. Cl.
*G06F 3/048* (2013.01)
*H04N 5/232* (2006.01)
(Continued)

(52) U.S. Cl.
CPC ....... *H04N 5/232935* (2018.08); *G06F 3/005* (2013.01); *G06F 3/04883* (2013.01); *G11B 27/005* (2013.01); *G11B 27/036* (2013.01); *G11B 27/105* (2013.01); *G11B 27/34* (2013.01); *H04N 5/23216* (2013.01);
(Continued)

(58) Field of Classification Search
CPC ....... G06T 2200/24; G06T 2207/20132; G06T 2207/10004; G06T 2207/10021; G06T 19/00; G06T 2207/20104; G06T 2219/028; G06T 7/12; G06T 7/337; G06T 7/11; G06T 2207/20096; G06T 11/60; G06F 19/00; G06F 2203/04808; G06F 3/0425; G06F 16/284; G06F 3/0488; G06F 3/14; G06F 3/0416; G06F 17/211; G06F 17/2241; G06F 2203/04104; G06F 3/005; G06F 3/04883; H04N 1/00129; H04N 2201/0084; H04N 2201/0089; H04N 5/23293; H04N 5/272; H04N 5/23296; H04N 5/23222;
(Continued)

(56) References Cited

U.S. PATENT DOCUMENTS 5,990,954 A * 11/1999 Kobayashi ......... H04N 5/23293
                                                      348/333.03
6,486,914 B1 * 11/2002 Anderson .......... H04N 5/23216
                                                      348/333.02
(Continued)

*Primary Examiner* — William C Trapanese
(74) *Attorney, Agent, or Firm* — Ichthus International Law PLLC

(57) ABSTRACT

An image capturing device having a user interface in a form of a screen; wherein the user interface allows a user to provide instructions regarding positioning of the image capturing device to include at least one predetermined view point. The instructions are in a form of at least one of a voice, a text, and an image. The image capturing device can also have a storage device configured to (i) record the instructions; and (ii) store a captured image and a processor programmed to retrieve the instructions from the storage device when requested by a user via the user interface and to create boundaries around key objects that are being built.

15 Claims, 35 Drawing Sheets

(51) Int. Cl.
| | |
|---|---|
| *G11B 27/34* | (2006.01) |
| *G11B 27/00* | (2006.01) |
| *G06F 3/04883* | (2022.01) |
| *G06F 3/00* | (2006.01) |
| *H04N 5/272* | (2006.01) |
| *G11B 27/036* | (2006.01) |
| *G11B 27/10* | (2006.01) |

(52) U.S. Cl.
CPC ..... *H04N 5/23222* (2013.01); *H04N 5/23229* (2013.01); *H04N 5/272* (2013.01); *G06F 2203/04808* (2013.01)

(58) Field of Classification Search
CPC ... G11B 27/005; G11B 27/036; G11B 27/105; G11B 27/34
See application file for complete search history.

(56) References Cited

U.S. PATENT DOCUMENTS

| | | | | |
|---|---|---|---|---|
| 7,113,915 | B1* | 9/2006 | Montemayor | G06Q 10/06311 705/7.13 |
| 7,589,732 | B2* | 9/2009 | Burtnyk | G06F 3/04815 345/474 |
| 8,577,422 | B1* | 11/2013 | Ledet | G06F 3/011 455/566 |
| 9,110,560 | B1* | 8/2015 | Senesac | G06F 3/0481 |
| 9,218,692 | B2* | 12/2015 | Miller | G06T 17/00 |
| 9,406,170 | B1* | 8/2016 | Grampurohit | G06T 3/005 |
| 9,642,686 | B1* | 5/2017 | Kalman | A61C 9/0053 |
| 9,741,157 | B2* | 8/2017 | Nowak | G06T 15/10 |
| 9,841,271 | B2* | 12/2017 | Nakazato | G01B 11/03 |
| 9,898,852 | B2* | 2/2018 | Miller | G06T 15/00 |
| 10,051,103 | B1* | 8/2018 | Gordon | G06F 21/36 |
| 10,121,247 | B2* | 11/2018 | Meier | H04N 7/185 |
| 10,229,717 | B1* | 3/2019 | Davis | G11B 27/036 |
| 10,419,737 | B2* | 9/2019 | Pang | H04N 13/117 |
| 10,628,969 | B2* | 4/2020 | Fein | G06F 3/011 |
| 2004/0210470 | A1* | 10/2004 | Rusk | G06Q 10/063114 705/7.15 |
| 2005/0286759 | A1* | 12/2005 | Zitnick, III | G06T 15/205 382/154 |
| 2006/0028489 | A1* | 2/2006 | Uyttendaele | G09G 5/00 345/646 |
| 2006/0098112 | A1* | 5/2006 | Kelly | H04N 5/23222 348/333.12 |
| 2006/0119601 | A1* | 6/2006 | Finlayson | G06T 15/20 345/427 |
| 2006/0258449 | A1* | 11/2006 | Yasui | G06T 13/20 463/31 |
| 2007/0121182 | A1* | 5/2007 | Fukushima | G02B 27/2214 359/9 |
| 2008/0010601 | A1* | 1/2008 | Dachs | G06Q 10/10 715/751 |
| 2009/0222768 | A1* | 9/2009 | Roe | G06F 3/04815 715/850 |
| 2010/0026712 | A1* | 2/2010 | Aliprandi | H04N 13/111 345/629 |
| 2011/0055729 | A1* | 3/2011 | Mason | G06F 3/0425 715/753 |
| 2011/0098056 | A1* | 4/2011 | Rhoads | G06F 3/04847 455/456.1 |
| 2011/0216206 | A1* | 9/2011 | Ashforth | A63F 13/10 348/207.1 |
| 2012/0098977 | A1* | 4/2012 | Striemer | H04N 5/23229 348/207.1 |
| 2012/0268463 | A1* | 10/2012 | Loberg | G06F 30/13 345/420 |
| 2012/0306860 | A1* | 12/2012 | Hatta | H04N 13/279 345/419 |
| 2013/0120367 | A1* | 5/2013 | Miller | G06T 15/20 345/419 |
| 2013/0151379 | A1* | 6/2013 | Edwards | G06Q 30/06 705/26.81 |
| 2014/0198182 | A1* | 7/2014 | Ward | H04N 19/597 348/43 |
| 2014/0232838 | A1* | 8/2014 | Jorgensen | H04N 5/23203 348/61 |
| 2014/0300600 | A1* | 10/2014 | Marks | G06K 9/4661 345/426 |
| 2015/0042678 | A1* | 2/2015 | Alt | G06F 3/04815 345/633 |
| 2015/0058733 | A1* | 2/2015 | Novikoff | G11B 27/031 715/723 |
| 2015/0248791 | A1* | 9/2015 | Abovitz | G02B 27/4205 345/633 |
| 2015/0254868 | A1* | 9/2015 | Srikanth | H04N 5/23216 348/47 |
| 2015/0310135 | A1* | 10/2015 | Forsyth | G06F 30/13 703/1 |
| 2016/0142611 | A1* | 5/2016 | Nuggehalli | G16H 10/60 348/207.11 |
| 2016/0277661 | A1* | 9/2016 | Brav | H04N 21/23418 |
| 2016/0316176 | A1* | 10/2016 | Laska | H04N 21/431 |
| 2017/0083762 | A1* | 3/2017 | Segalovitz | G06K 9/00442 |
| 2017/0091994 | A1* | 3/2017 | Beeler | G06T 17/20 |
| 2017/0171322 | A1* | 6/2017 | Golding | H04L 67/148 |
| 2017/0192651 | A1* | 7/2017 | Yang | G06F 3/04845 |
| 2017/0243352 | A1* | 8/2017 | Kutliroff | G06T 7/10 |
| 2017/0262247 | A1* | 9/2017 | Yoganandan | G09G 5/14 |
| 2017/0358321 | A1* | 12/2017 | Kilar | G11B 27/002 |
| 2018/0330756 | A1* | 11/2018 | MacDonald | G06F 16/7328 |
| 2019/0213778 | A1* | 7/2019 | Du | G06T 15/04 |

* cited by examiner

Project Entity – UI Example

Photo Capture UI

Viewpoint Directive Drawer - Expanded

Photo Capture UI – Displaying Last Photo

Photo Capture
Last Photo Not Displayed

Photo Capture
Last Photo Displayed with 50% Opacity

Photo Capture UI – Displaying Last Photo

Photo Capture UI – Displaying Edge Stencil

Photo Capture - Viewpoint
Directive Location Direction

Not at Viewpoint
Directive Location 834  830  832

At Viewpoint
Directive Location 834
832  830

User Flow

Viewpoint Directive Entity

Scroll-Seek - Change Viewpoint

Scroll-Seek – Change Viewpoint

CAPTURE AND DISPLAY DEVICE

CROSS-REFERENCE TO RELATED APPLICATION

This application claims the benefit of U.S. Provisional Application No. 62/443,454 filed on Jan. 6, 2017, the content of which is expressly incorporated herein by reference thereto.

FIELD OF THE INVENTION

The present invention relates to a device capable of creating a project portfolio and method and system for structured capture and display of multi-viewpoint projected progression.

BACKGROUND

Selecting a contractor or mechanic for any project, such as improving your home or fixing your vehicle, can be very stressful and random. It is very difficult to tell if the work was done properly and according to code.

Presently, the most reliable method for proving that a contractor's or mechanic's work is up to standard and is of high quality is by word of mouth and opinion of others. However, each individual's standard is different. Thus, if one person believes that a contractor's work is of a high quality a second person might think that the work was sub-standard.

Thus, there is a need for a system and a device that enables a contractor to capture a project from its inception to its completion so that the work speaks for itself and each individual can make his/her own conclusion about the quality of work and not rely on someone else's subjective opinion.

SUMMARY OF THE INVENTION

In an embodiment of the present invention, an image capturing device can have a user interface in a form of a screen. The user interface can allow a user to provide instructions regarding positioning and directing of the image capturing device to include at least one predetermined view point. The instructions can be in a form of at least one of a voice, a text, and an image. The image capturing device can also have a storage device configured to record the instructions and can store a captured image. It can also have a processor programmed to retrieve the instructions from the storage device when requested by a user via the user interface and to create boundaries around key objects that are being built.

In another embodiment, when the instructions are in a form of the image, the image is at least one of a stencil image, a template photo, and an overlay photo.

In yet another embodiment, when the instructions can be in a form of the overlay photo, the image capturing device comprises a controller to control the opacity of the overlay image.

In another embodiment, when the instructions can be in a form of the text, the text can be at least one of directions to a location and a location coordinates.

In yet another embodiment, the image capturing device can have an indicator to confirm the position of the image capturing device that can have the at least one view point.

In an embodiment of the present invention, a method of monitoring construction can be generating a project entity comprising a direction to a list of viewpoints and storing the project entity in a storage device. Additionally, it can use the step of capturing at least a photo at each viewpoint in the list of viewpoints, providing an edge stencil image at each viewpoint, and indicating that the image is property aligned with the edge stencil image.

In another embodiment, the step of generating the project entity further comprises creating a project name.

In another embodiment, the method of monitoring construction can have the step of transmitting the project entity to application programming interface (API) platform to generate the project entity on the platform.

In a further embodiment, method of monitoring construction can have the step of editing the project entity by adding and/or incorporating an updated direction to at least one viewpoint to the transmission to be sent to the platform.

In yet another embodiment, method of monitoring construction can have the step of receiving the transmission and reconciling changes from the transmitted direction to a viewpoint list with platform's viewpoint project entity list.

In another embodiment, method of monitoring construction can have the step of displaying attributes of the viewpoint.

In an embodiment of the present invention, a screen can have an array of at least one of an image and a video, which at any given time, a single one of the image or the video can be displayed on the screen. A processor can be configured to detect a first gesture of an operator, such as by an operator's finger on the screen, from a first position to a second position upon the screen. Upon the detection of the gesture from the first position to the second position, the screen can display the next one of series of images and/or videos on the screen, and wherein as the video displayed on the screen is being transitioned to a next video, the displayed video is played.

In another embodiment, the array of at least one of an image and a video related images and videos on a first axis or a first pattern and unrelated images and videos on a second axis or a second pattern.

In a further embodiment, the related images and videos can be videos from different viewpoints for the same subject matter.

In yet another embodiment, the screen can have a video frame range selector configured to select a predetermined number of video frames to be played at a desired predetermined speed.

In a further embodiment, the screen can have a speed selector that enables a user to play the selected predetermined number of video frames at a desired predetermined speed.

In yet another embodiment, the processor is configured to detect a second gesture to play a video displayed on the screen, wherein a speed at which the video is played is dependent on the speed of the second gesture.

In a further embodiment, the screen includes at least one sensor configured to detect the first gesture.

In a further embodiment, the sensor is at least one of a motion sensor, pressure sensor, and touch sensor.

In yet another embodiment, the pressure sensor is configured to perform a function depending on an amount of force applied to the screen.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present invention in its several aspects and embodiments solves the problems discussed herein and significantly advances the technology of capturing and displaying device. The present invention can become more fully understood from the detailed description and the accompanying drawings, wherein.

Throughout this specification and figures like reference numbers identify like elements.

DETAILED DESCRIPTION OF THE INVENTION

In its broad and varied embodiments, the invention disclosed herein relates to an image capturing device with a user interface that can allow a user to align the image capturing device to capture an image, at different times, at a plurality of locations showing different perspective of an item or a project in progress. The images at each of the plurality of locations can be captured at predetermined intervals (i.e., timed intervals), at a project milestone, or at an interesting part of the project. The user can align the image capturing device to capture a plurality of images at a plurality of locations, showing different perspective through various user interface (UI) elements available and/or programmed in the image capturing device. Some exemplary UI elements that can be available can be textual guidance, voice guidance, coordinates provided by triangulations, such as Global Positioning System (GPS). This image capturing device can compose the multiple images captured at a plurality of locations to create a smooth progression of the project in a form of a time-lapse videos, photo collages, and before and after comparisons.

The image capturing device insures that the viewers are offered a consistent context while browsing project changes over time. Moreover, it allows the users to zoom into various parts of the project to view the details, keeping an area of the image static while seeking through time, and allowing time based comparisons of specific objects or areas.

Herein, any system and/or software disclosed can execute rule-based logic and/or other processing and/or other decision making by processing and/or using a single "criterion" or a plurality of criterion herein as "criteria." For example, a criterion can be for nonlimiting example material price, quantity of installation labor, or object size or other data that is a variable in the rule-based logic, or other decision making process. In the disclosure herein, when a decision or processing step can be executed based on a single criterion, the disclosure is intending to be broad and includes a single criterion, at least one criterion, or criteria. There is no limitation to the upper number of criteria which can be used. There is no limitation that criteria (plural) be used, if a single criterion (singular) can allow for a processing or logical step to be made.

Figure 1:
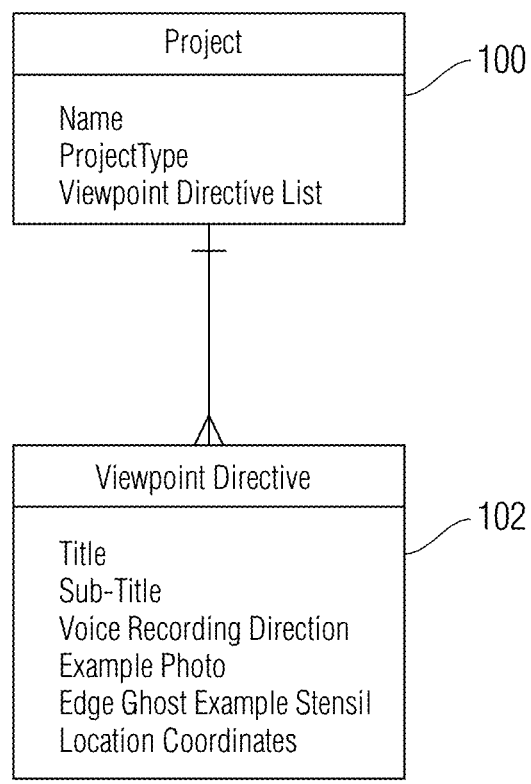
FIG. 1 is a diagram illustrating the project and viewpoint designations and their relationship, according to an example of the present disclosure.

Referring to FIG. 1, to create and start a project, a user can input the project's information at step 100. The information can be one or more of a project name, a project type, a starting date, an address, and a location at which the image capturing device is positioned to capture at least one image (viewpoint directive). The project name can be in a form of a text, or a voice. In one example, as shown in FIG. 11b, the project name 1110 can be displayed below the image. Referring back to FIG. 1, the viewpoint directive 102 can be a description and/or an instruction that can be used by a user at a future time to be able to replicate the location where the original image was captured. The description in the viewpoint directive 102 can be a single text based title, for example, North East corner of the kitchen, a title with subtitles, for example, second floor bedroom, North East corner, recorded voice instructions, an alignment edge stencil image, a template photo, and/or location coordinates.

In an embodiment, a user can input the directions to the viewpoint directives 102 via voice input. In one example, the image capturing device can include a sound recorder, such as a microphone, and a storage device to store the voice inputted directions. The voice can also be a recorded via the app when editing the viewpoint directive list or can be prerecorded. In an embodiment, the directions/instructions can be provided by a text. In this example, an application embedded within the image capturing device can convert the provided text to a speech. For example, a directive could contain a title, which would state the general name and/or location of the viewpoint (e.g., kitchen island, North East corner) and also a corresponding subtitle which would give specific direction on how the photo should be captured (e.g., clearly show the top granite of island while still showing the supporting wood cabinetry below).

In an embodiment, a user can input the viewpoint directives 102 via an alignment edge stencil image. This embodiment entails capturing an image of a replacement item or part by taking a photo of the replacement item, by importing an image from an external source, or generating an image through an editor. A processor in the image capturing device can create boundaries from the photo or image, thus offering the user capturing images alignment cues to assure the user that the image that is being captured has a proper vantage point. In an embodiment, once the image capturing device is positioned such that the image to be captured is aligned with the boundaries, the image capturing device can provide an indicator to the user that the image is aligned and the image should be captured.

Any system can be adapted to be implemented as a web application, a smartphone app, a mobile phone app, a tablet app, a laptop app, a personal data device app and/or a mobile app. In an embodiment, a logic and a user interface element can be adapted to be implemented as a web application, a smartphone app, a mobile phone app, a tablet app, a laptop app, a personal data device app and/or a mobile app. Herein the term "app" is to be broadly construed to, in addition to its ordinary and customary meaning, also encompass and mean any software application and/or hard coded application and/or software means, which can run any part of or all of the computer software and methods disclosed herein. Herein "app", "application" and "software application" are used synonymously. It is intended that this disclosure and the term "app" include individual devices, multiple devices, cloud-based systems and distributed system and any devices, which can interface with any such systems. Software as a service and alternative processing and/or computing platforms are also encompassed and hereby disclosed.

A computer system, according to various embodiments, can include at least one processor and memory. In an embodiment, the computer system can be configured for displaying user interface elements implementing and executing logic described in the enclosed figures. The computer system can also be a non-transitory computer-readable medium, according to various embodiments, stores computer-executable instructions for: displaying user interface elements implementing and executing logic described in the enclosed figures.

Throughout this application, it is understood that the terms "computer executable software code", "computer readable code", "program readable code" and computer executable code are used synonymously and in addition to their ordinary and customary meaning encompasses the meaning of a set of instructions that can be read by and executed by a computer processor and/or system and/or computing device. The application is not limited regarding the nature and/or type of computer executable software code and encompasses any and all code readable and executable by a computer and encompasses and equivalents and/or means, such as the terms "a computer executable program code means" and "a computer readable program code means," which are used herein synonymously and which are intended to encompass any time of software and/or program code and/or instructions readable and/or executable by a computing device and/or computer.

All of the embodiments herein can be made, used, implemented and executed by computer readable program code means. There is no limitation as to the type and nature of computer readable program code means, which can be used to achieve the methods and calculations disclosed herein. The software products are not limited and can broadly be any software and or application product capable of processing the numerical methods and calculations disclosed herein. The software products can be applications, subroutines, mobile applications, smartphone applications, wireless applications, cloud-based applications, cloud-based services, or any by computer readable program code means adapted to achieve the methods disclosed herein. There is no limitation on the nature of the product whether the application is source code, compiled code, non-compiled code, downloaded code, compressed code, executable code. This disclosure expressly encompasses any product, which provides the method herein to a use and which can provide to, implement, execute, support or enable a user to practice, make or use any method disclosed herein in any embodiment or part thereof.

All of the embodiments herein are transformative in nature. The disclosed methods are to be executed by a computer to transform data regarding at least one item with at least one attribute and an at least one uncertainty by computer means to achieve an output, which can be perceived and utilized by a user of the methods disclosed herein.

The embodiments herein are highly transformative and are technological methods and means, which advance computer and software technology and which are robust and transform input, parameters, criteria, knowledge and/or data into useful and value added information upon which a user can base a decision, or which is transformed through technology into information which in itself is a decision, a solution, a result, a product, an output and/or outcome. The transformation of input and/or data by the computer and software embodiments herein achieves decision support and/or decision results previously not possible. The embodiments herein are transformation technologies and are also computer integral technologies to achieve the transformations (e.g. computer processing, calculations, values, results, choices, solutions and outcomes) disclosed and achieved herein.

Numeric values and ranges herein, unless otherwise stated, also are intended to have associated with them a tolerance and to account for variances of design and manufacturing. Thus, a number can include values "about" that number. For example, a value X can be also intended to be understood as "about X". Likewise, a range of Y-Z can be also intended to be understood as within a range of from "about Y-about Z". Unless otherwise stated, significant digits disclosed for a number are not intended to make the number an exact limiting value. Variance and tolerance can be inherent in mechanical design and the numbers disclosed herein are intended to be construed to allow for such factors (in non-limiting e.g., ±10 percent of a given value). Likewise, the claims are to be broadly construed in their recitations of numbers and ranges.

Figure 2:
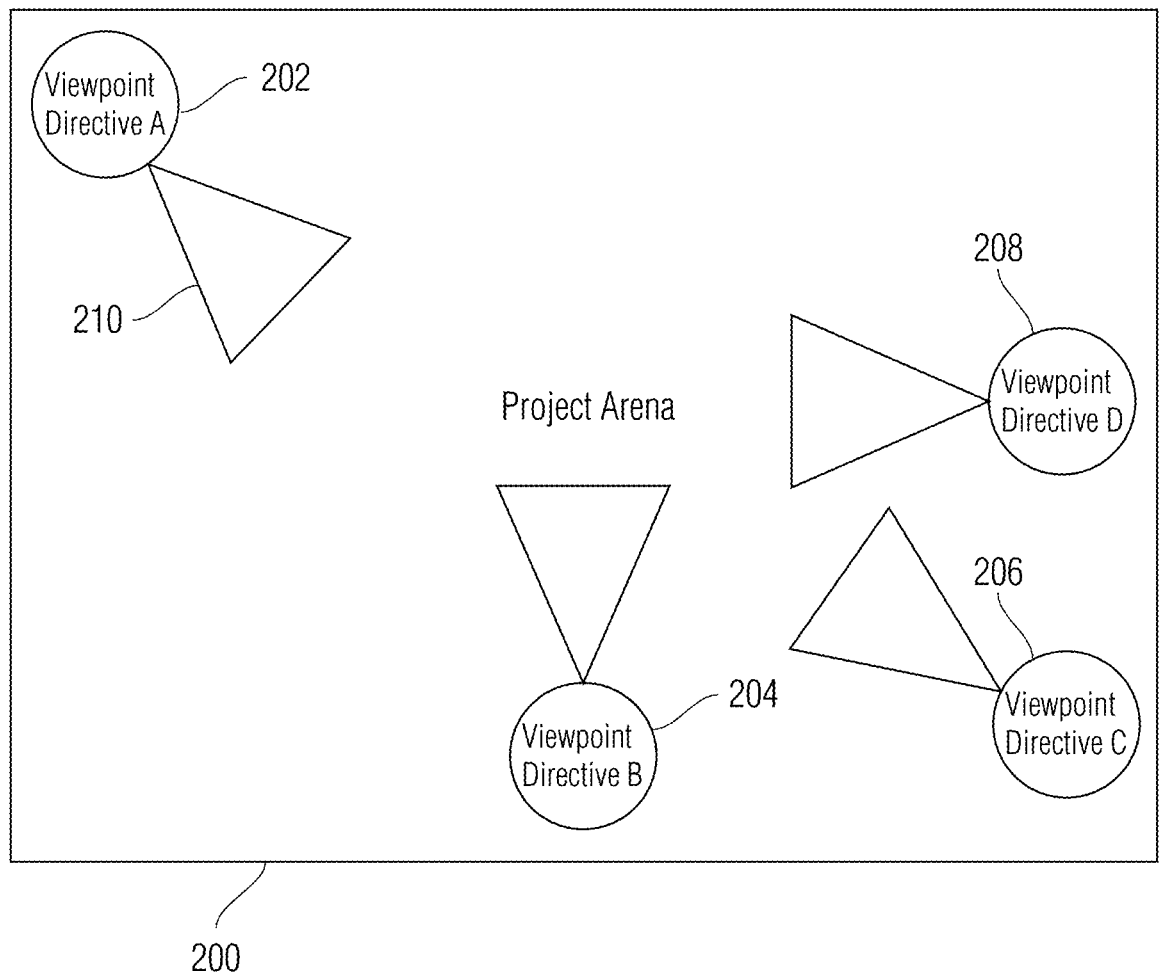
FIG. 2 is a diagram illustrating spatial relationship between viewpoint locations within a project, according to an example of the present disclosure.

FIG. 2 illustrates an example of location of each of a plurality of viewpoints having vantage points 210. Each of the vantage points 210 can be originated from locations 202, 204, 206, and 208 within a project area 200.

Figure 3:
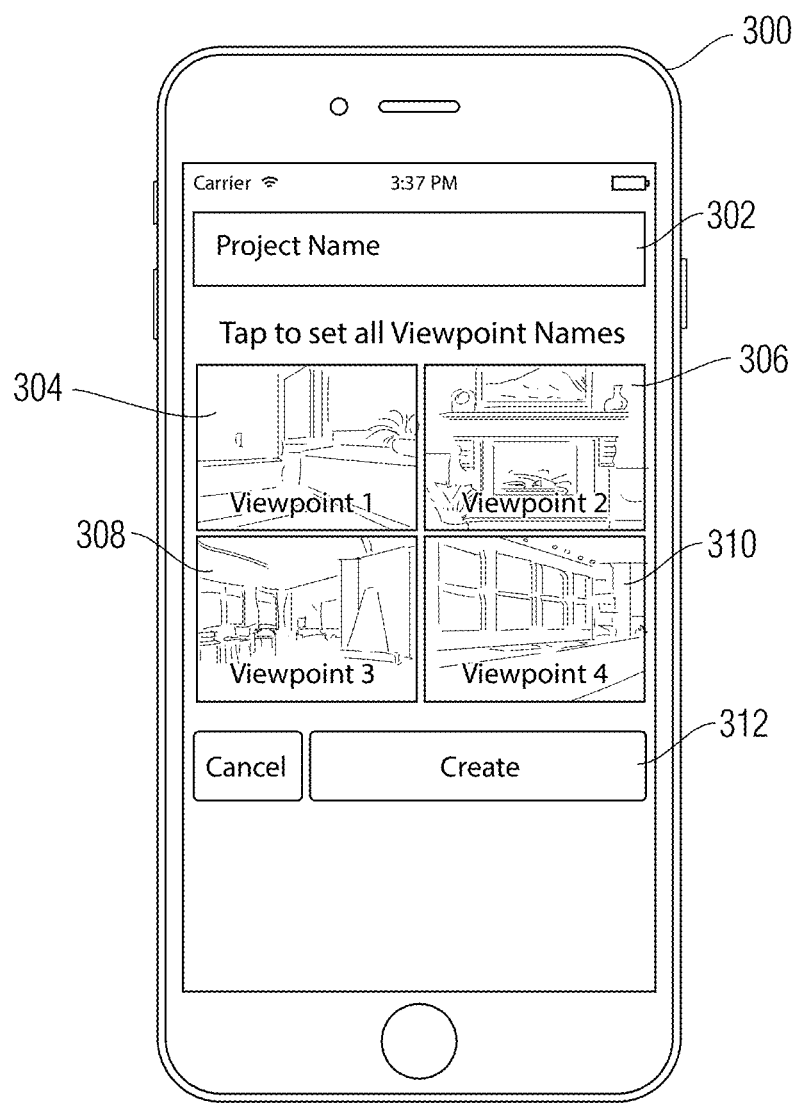
FIG. 3 is a screenshot showing an exemplary user interface capturing data that results in producing a project entity and one or more viewpoint directive entities, according to an example of the present disclosure.

FIG. 3 illustrates an image capturing device having a user interface 300. The user interface 300 can have input fields, such as a project name 302, a list of viewpoint directives 304, 306, 308, 310 that would allow a user capture a single or multiple images having approximately the same viewpoints as when the original images were captured. These viewpoint directives correspond to locations 202, 204, 206, and 208 in the project area 200. In an embodiment, the user can have the ability to re-arrange the order of the viewpoint directive list via the user interface 300. In this particular embodiment, once the user has re-arranged the viewpoint directive list, the user can save the changes and can create a data entity on a supporting platform by pressing the button 312.

Without limitation, various embodiments of the present invention can be, for example, embodied as a computer system, a method, or a computer program product. Accordingly, various embodiments can take the form of an entirely hardware embodiment, an entirely software embodiment (e.g., one or more computer application, such as an "app" to be implemented on a mobile device and/or an application to be implanted on a desktop computer), or an embodiment combining software and hardware aspects. Furthermore, embodiments can take the form of a computer program product stored on a computer-readable storage medium having computer-readable instructions (e.g., software) embodied in the storage medium. Various embodiments can take the form of web-implemented computer software. Any suitable computer-readable storage medium can be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions can be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions can also be stored in a computer-readable memory that can direct a computer or other programmable data processing apparatus to function in a manner such that the instructions stored in the computer-readable memory produce an article of manufacture that can be configured for implementing the function specified in the flowchart block or blocks. The computer program instructions can also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

The entire system can be accessible from various computer platforms, including mobile devices. Mobile devices can have native apps created in order to allow quick access to the system. These mobile apps can launch the responsive web platform on the mobile device and also allow access to the communication services on the mobile device. This can allow notifications to be pushed out to users when new offers or academic information are uploaded into the system. In order to increase the speed of the app, information concerning the student can be saved on the mobile device.

FIGS. 3, 4a, 4b, 5, 6, 7a, 8k, and 10i are rule based logic flow diagrams which can be implemented in executable program code.

Figure 4A:
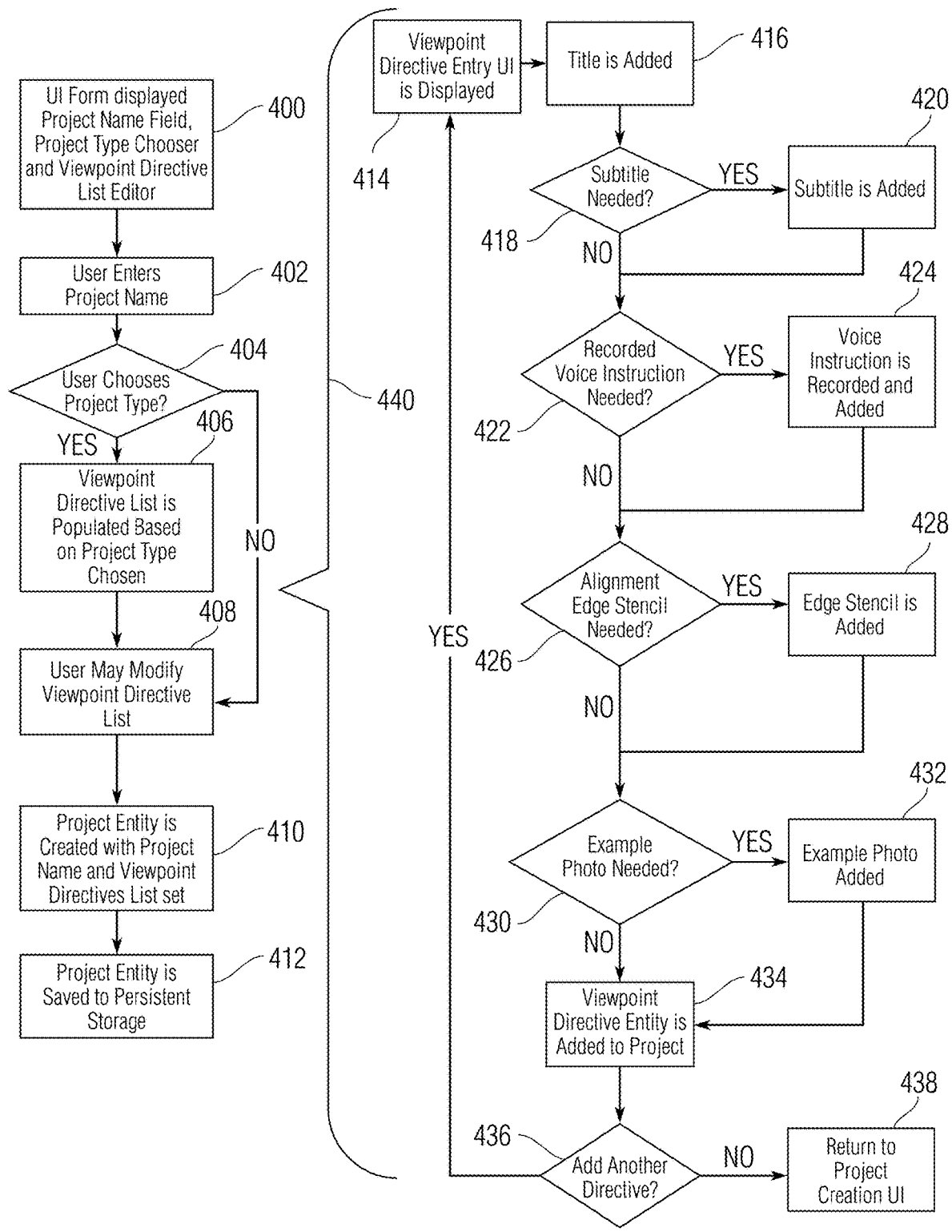
FIG. 4a is a flow diagram showing the process in which data producing a project and viewpoint directive(s) is captured through a user interface, according to an example of the present disclosure.

FIG. 4a is a flowchart showing an exemplary set of steps that can be performed to generate a project entity via a user interface 300. Referring to FIGS. 3 and 4, at step 400, a user can display the user interface 300 on the image capturing device and, at step 402, the user can input the project name 302 from a project manager or creator. At step 404, the user can enter a project type. By entering the project type, the image capturing device can automatically recommend viewpoint directives that are commonly required and that can be desired for marketing or compliance purposes. For example, if the project is to remodel a small bathroom, the recommended viewpoint directive titles can be vanity, flooring, shower, and toilet. Each of the titles can correspond to picture or placement of the vanity, flooring, shower, and toilet, respectively. At step 406, these recommended viewpoint directives autofill the directive list. At step 408, the user can add, remove, or edit the viewpoint directives 304, 306, 308, and 310 and their associated attributes within the sub-process 440. At step 410, the user has completed the viewpoint directive list, and at step 412, the viewpoint directive list can be transferred to a data storage on the platform created by pressing the button 312.

As stated above, sub-process 440 can be responsible for adding, removing, or editing the viewpoint directives 304, 306, 308, and 310 and their associated attributes. The viewpoint directives that has been created by the sub-process 440 cannot require a user to add or edit a title at step 416. However, if a title is necessary or if the user would like to add or edit a title, at step 414, a viewpoint directive entry is displayed, and, at step 416, the sub-process 440 allows the user to add or edit a title. At step 416, the user can elect to optionally add or edit a subtitle. If the user elects to add a subtitle, then at step 420, a subtitle is added. At step 422, the sub-process 440 can provide the user with an option to record voice instructions relating to the location and position of the image capturing device so that the user or another user can capture a second image with the same vantage point as the originally captured image. If the user elects to record a voice instruction, at step 424, the voice instruction can be recorded and saved in a memory of the image capturing device. In one embodiment, the voice instruction can be related to any matter or can be in a form of a note and not necessary instructions. At step 426, the sub-process 440 can provide the user with an option to provide alignment edge stencil so that boundaries are created from the photo or image, thus offering the user capturing images alignment cues to assure that an image that is captured has a proper vantage point. If the user elects to input an alignment edge stencil, at step 428, the user can add the edge stencil and save the edge stencil in a memory of the image capturing device. Additionally and/or alternatively, at step 430, the sub-process 440 can provide the user with an option to provide an exemplary photo or image. The exemplary photo or image can emulate the vantage point and can be displayed using ghost overlay feature. If the user elects to input an exemplary photo, at step 432, the user can add the exemplary photo and save the exemplary photo in a memory of the image capturing device.

At step 434, the viewpoint directive entry, which were created in anyone of steps 420, 424, 428, and 432 can be added to the project. If additional viewpoint directive entries are required, at step 436, the user can request for additional entries and the process can begin, again, starting with step 414. This process can be repeated as many times as necessary until all viewpoint directives have been entered. Once all of the viewpoint directives have been entered, at step 438, the user can be directed back to the project creation user interface.

Figure 4B:
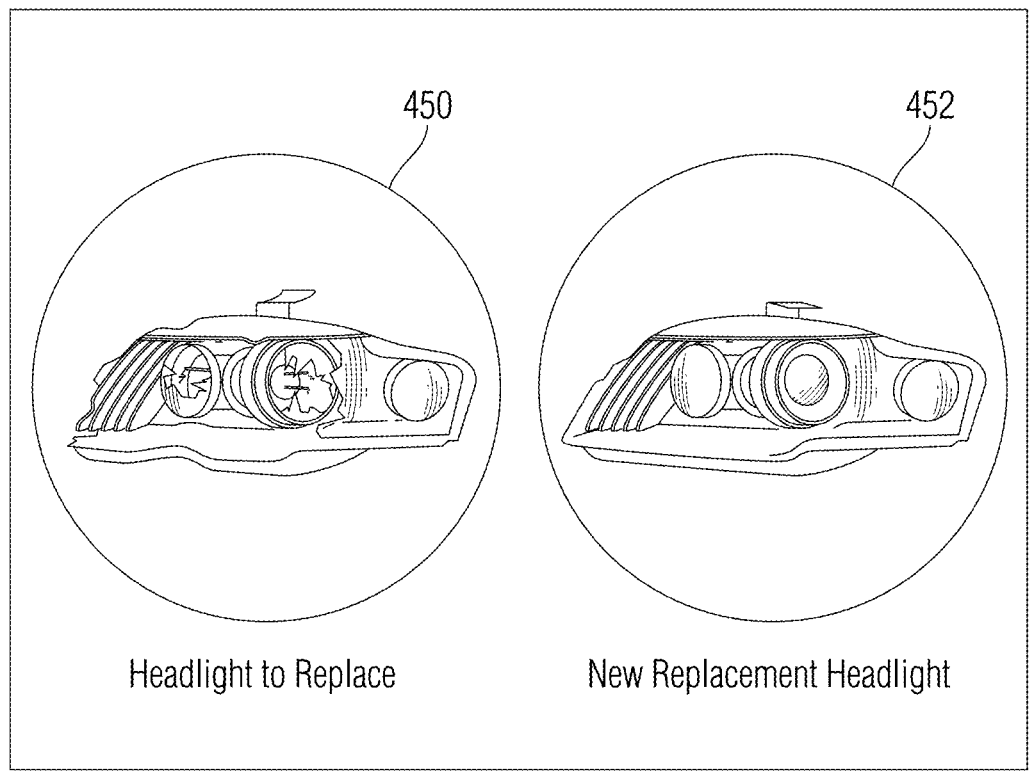
FIG. 4b diagram showing a viewpoint directive edge stencil image depicting an appropriate starting and ongoing template for image capture through the duration of the project, according to an example of the present disclosure.

FIG. 4b is a diagram showing a viewpoint directive edge stencil image, which can be pixel or vector based and illustrates an appropriate starting and ongoing template for an image captured through the duration of the project. This image can be imported from an external source or can be created by an editor within the platform. The edge shape, for example edge shape of a broker headlight 450, can create boundaries so that the user can capture images using the alignment cues, assuring that the image is captured with the proper vantage point. In one embodiment, once the image to be captured is aligned and includes the proper vantage point, an indicator on the image capturing device can alert the user about the proper alignment. This indicator can be a visual or an audible indicator or alerts. For example, the indicator can be in a form of a flash, a text, or a sound. Once the broken headlight 450 has been replaced with the new headlight 452, the process can be repeated to show the change of the headlight.

The project viewpoint directives can remain static, edited (add/rename/delete), or reordered after project initiation. These can be accomplished by a user intervention or through an automated process. Some possible reasons for editing a viewpoint directive are user oversight or supplemental scope that can require expansion of coverage. For example, during a construction renovation project, if the owner decides to add additional cabinets or replacing the flooring, etc. In another example, during a vehicle repair, additional damage can be discovered during disassembly, which can cause expansion of the project.

Figure 5:
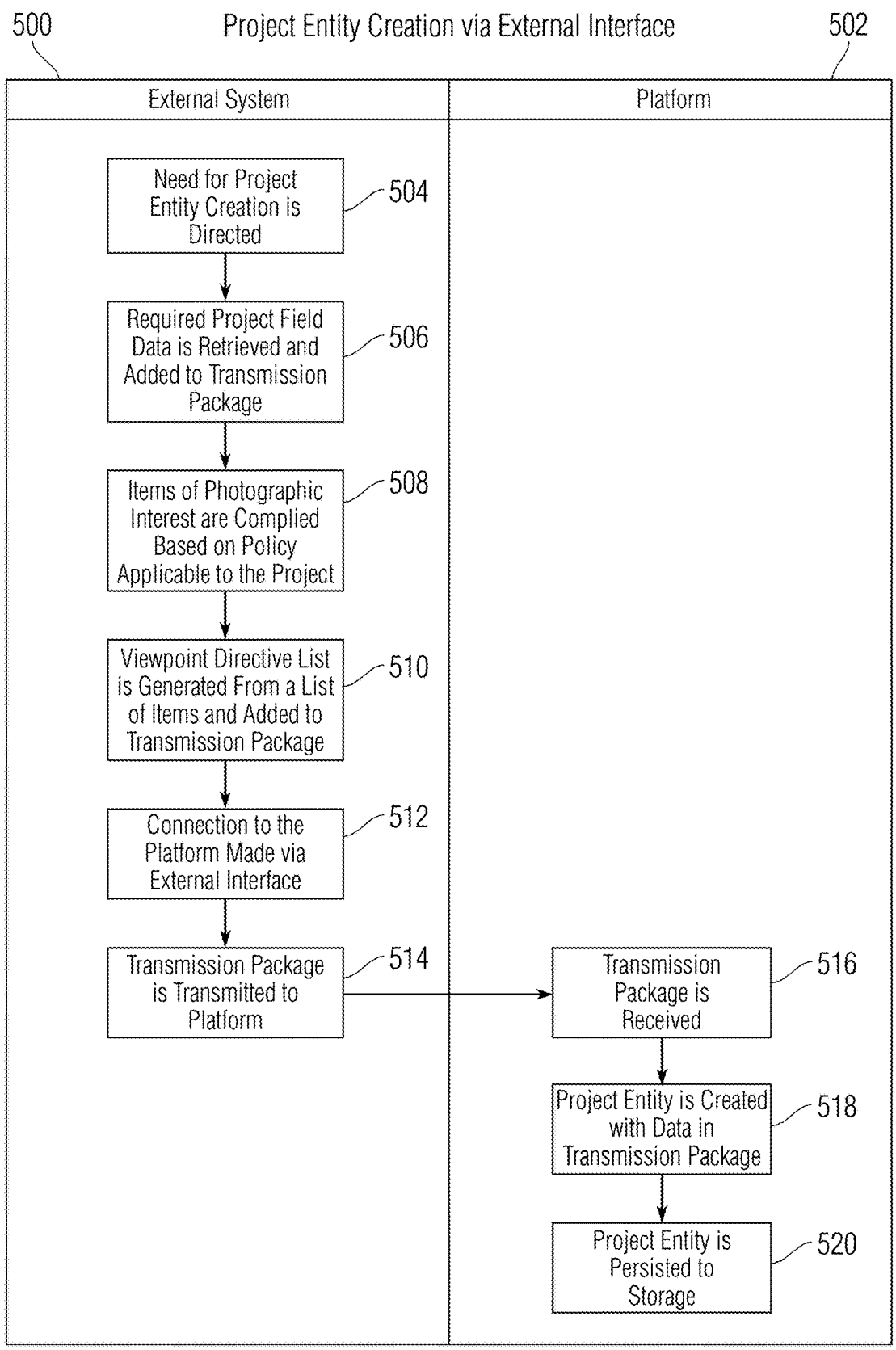
FIG. 5 is a flow diagram showing the process in which a project and viewpoint directive(s) is generated via an external system, according to an example of the present disclosure.

FIG. 5 is a flowchart showing an exemplary set of steps that can be performed to generate a project entity by an external user interface. In this embodiment, starting with external system 500, at step 504, a program in the external system determines and/or detects that there is a need to create a project entity on the platform. At step 506, the program in the external system can retrieve the required project field data, such as one or more of a project name, location, file identification, and client name. The retrieved project fields can be added to a package that can be transmitted to the platform. At step 508, the program, in the external system, can analyze the project's work list and compile the interested images based on their applicability on the project. The work list can be a list containing items or steps that need to be executed in order to complete the project. To analyze the project's work list, the program can refer to a rule set derived from a policy. If a specific rule is matched with a work item, the work item can be deemed photographically important. For example, if a project work order contains an item, such as installing a kitchen island, that costs over a predetermined value, for example over $1000, then the kitchen island can be determined by executable program control logic to fit the rule and can be designated, by executable program, as photographically interesting or important. At step 510, the program executable code in the external system can generate the viewpoint directive list of the project of interest from a list of different items or projects and can add the generated viewpoint directive list to the transmission package that can be transmitted to the platform. At step 512, the external system can be connected to the platform via an external interface, such as a web application programming interface (Web API) that can allow uploading of a transmission package over an authenticated channel. At step 514, the transmission package can be transmitted to the platform. The platform, at step 516, can electronically receive the transmitted package of step 514 and in response, at step 518, a project entity can be generated by executable program code to be on the platform having all of the information previously created in the external system. At step 520, the information in the transmitted package can be stored in a digital memory.

Figure 6:
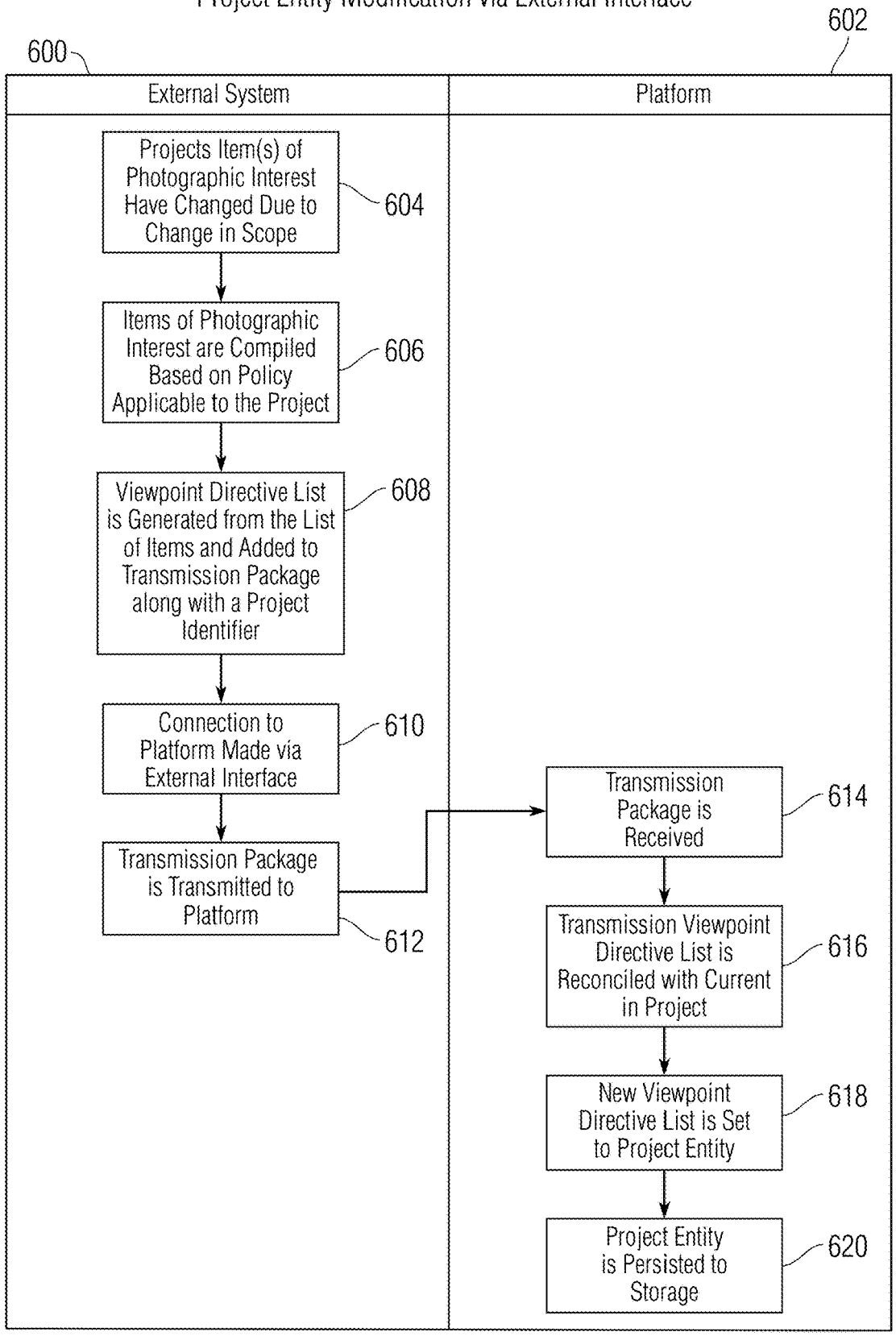
FIG. 6 is a flow diagram showing the process in which a project and viewpoint directive(s) is manipulated via an external system, according to an example of the present disclosure.

FIG. 6 is flowchart showing an exemplary set of steps that can be performed to edit a project entity via an external interface 600. In this embodiment, at step 604, the user or the external system can determine that the project's item(s) of interest, such as the captured images, need to be changed due to any number of reasons, such as change in scope of work. At step 606, the program in the external system can compile the interested images or edited images based on their applicability on the project in a similar manner described above with respect to step 508. At step 608, the program in the external system can generate or update the viewpoint directive list of the project of interest from a list of different items or projects and can add the generated or updated viewpoint directive list to the transmission package that will be transmitted to the platform. At step 610, the external system can be connected to the platform via an external interface, such as the external interface of step 512 described above. At step 612, the transmission package can be transmitted to the platform. The platform, at step 614, can receive the transmitted package of step 612 and in response, at step 616, the transmitted viewpoint directive list or transmitted updated viewpoint directive list can be reconciled with the current project. At step 618, the new or updated viewpoint directive list is set to the project entity and at step 620, the storage entity with updated data can be stored in the storage device.

Figure 7A:
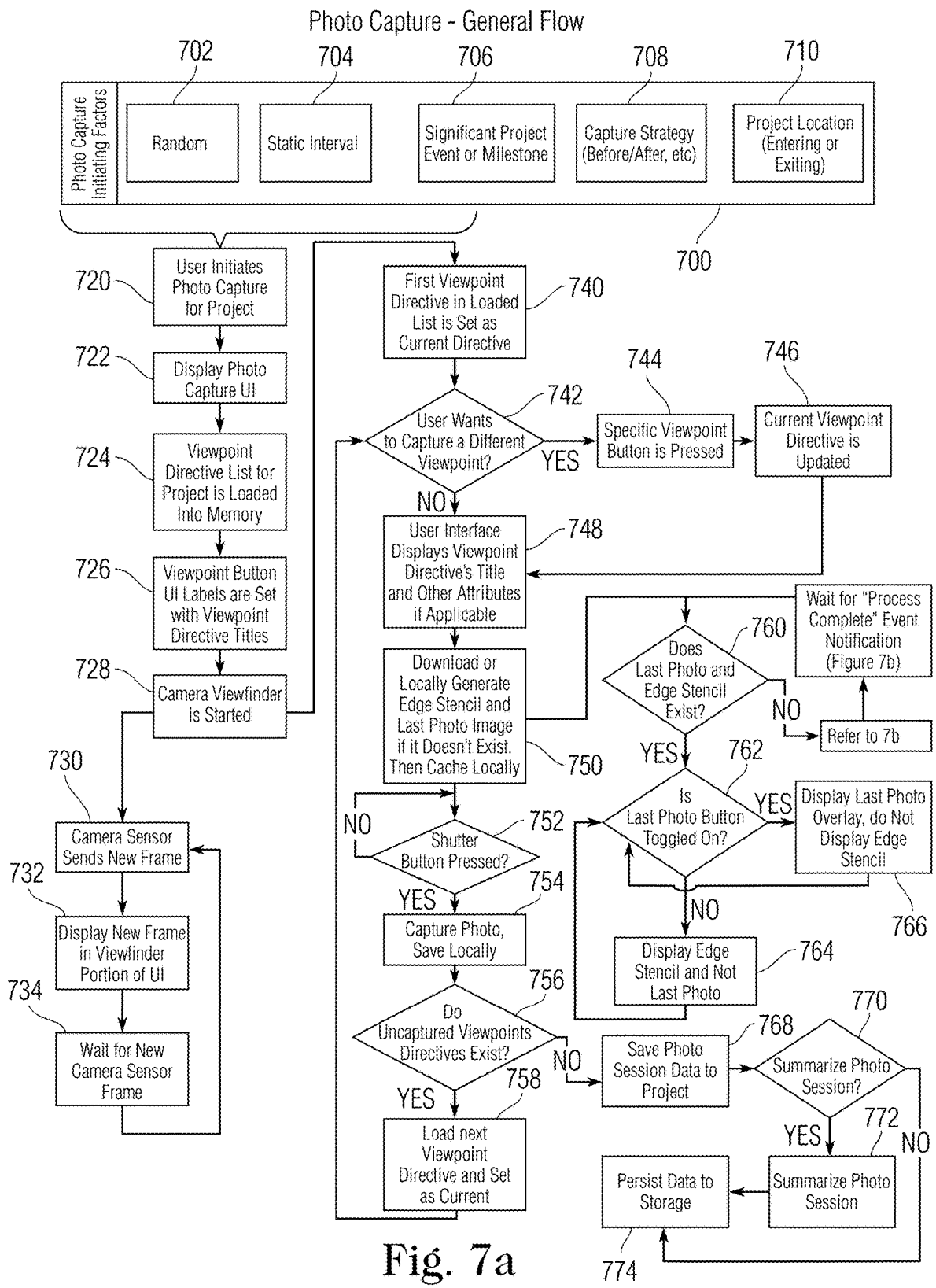
FIG. 7a is a flow diagram showing the photo capture process and its initiating factors, via a camera enabled handheld device, according to an example of the present disclosure.

FIG. 7a is a flowchart showing an exemplary set of steps that can be performed to capture a set of images or an updated set of images of a project, such as a home improvement project, to create a photo session. A photo session can be a set of captured images that represent the list of viewpoint directives at the time. As shown at step 700, a photo session can be initiated by several factors. These factors include, but are not limited to, random initiation 702, static interval initiation 704, significant project event or milestone initiation 706, capture strategy initiation 708, and project location initiation 710. The random initiation 702 is a photo session that starts for no apparent reason by the user. A static interval initiation 704 can be based on a timer that reminds the user to capture a photo at each of the viewpoint directives at a set of interval. In an embodiment, the static interval initiation 704 can be an optional attribute of the project. The significant project event or milestone initiation 706 can be based on installation of a major item in the project, a new phase of the construction project, completion of a replacement of an old or damaged object. The capture strategy initiation 708 can be based on capturing an image before, mid-way, and at the end of a project. The project location initiation 710 can be based on when a user enters or leave the project area. In this embodiment, the image capturing device can have one or more location sensor, detector, or subsystem. Using the location detector, if a user of the image capturing device is within a predetermined distance from one or more locations of the last photo session, the photo capturing device can send an alert to the user, via an app on the image capturing device, to remind the user to capture an image of the work area. If the user with the image capturing device is within a predetermined distance from two different viewpoint directions or projects, the photo capturing device can provide the user with a list of possible viewpoint directives or projects. The associated project or viewpoint can then open automatically in an image capturing or displaying the image capture interface, such as one shown in FIG. 8b.

Figure 8A:
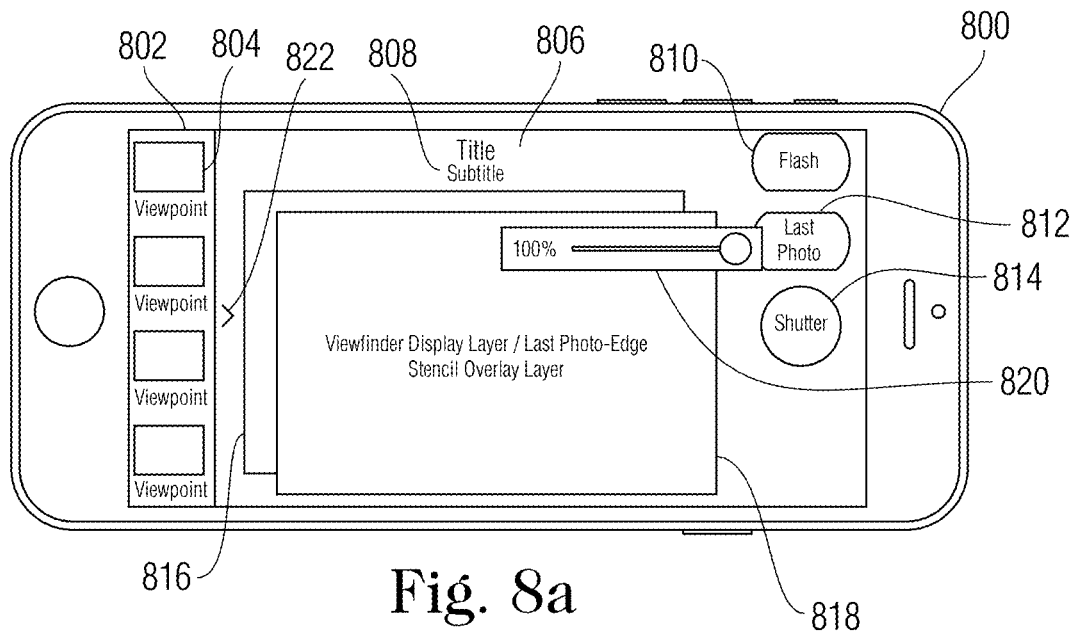
FIG. 8a is a screenshot showing all of the user interface elements utilized during an image capturing session, according to an example of the present disclosure.

Once the photo session has been initiated by at least one of the factors in steps 702-710, at step 720, the user can capture an image for a desired project. To capture the image, at step 722, a user interface can be displayed and, at step 724, the viewpoint directive list can be loaded into the working memory of the image capturing device. As a result, at step 726, the one or more viewpoint buttons can be displayed on the screen of the image capturing device with their corresponding titles. In one example, the screen can be a touchscreen or a pressure sensitive screen. Exemplary viewpoint buttons with their corresponding titles are shown in FIG. 8a at 804. At step 728, the image capturing device's viewfinder can be initiated. In an example, the viewfinder can be a display panel that is capable of showing real-time video representation of images being captured by a selected sensor on the image capturing device. If new frames are required, the viewfinder can start a series of steps that can result in producing new frames. For example, at step 730, a sensor in the image capturing device can send or provide a new frame. An example of such a sensor can be a digital camera located anywhere within the image capturing device. The camera can have one or more lenses and a CMOS (CMOS) or other photon detecting sensors. At step 732, the image capturing device can display a new frame in the viewfinder portion of the user interface. Finally, at step 734, the image capturing device can wait for a new image sensor frame.

In an example, simultaneously, while loop including steps 730-734 are being processed, at step 740, the first set of viewpoint directives list can be loaded and can be designated as the current directives. At step 742, the user can select to change, replace, or edit one or more of the viewpoints. If the user decides to change, replace, or edit a view point, the user at step 744, can press a specific viewpoint, such as one of the viewpoint buttons 804, shown in FIG. 8a. If the one or more of the viewpoint buttons 804 are pressed, then at step 746, another viewpoint can be uploaded and/or the current viewpoint can be updated with another preselected viewpoint or with a new viewpoint that has been or is captured.

At step 748, the user interface in the image capturing device can display the applicable attributes, such as the title, of the viewpoint directives. In an embodiment, as shown in FIG. 8a, the attributes can be title 806 and subtitle 808. The image capturing device can also play an audio instructional voice recording direction, display the example image within an overlay layer 818, display an exemplary edge stencil within the overlay layer 818, and display the location interface element 830 with an associated location coordinates. If the viewpoint image is not the first photo session for this project, an edge stencil, which was generated from the last captured image for the current viewpoint directive, can be displayed in the overlay layer 818.

At step 750, the edge stencil image can be downloaded from a server or can be generated on the device based on the previously captured image that was locally stored. In an example, the processor, at step 760 can determine if the last photo and edge stencil exist. Alternatively, if it is not determined automatically, the processor can ask the user if the last photo and edge stencil exist.

If the last photo and edge stencil does already exist, a last photo button 812, shown in FIG. 8a, is pressed and held. By pressing the last photo button 812, the following process steps occur: at step 762, it is determined that the last photo button toggle is on. If the last photo button toggle is on, then at step 766, the last photo overlay can be displayed on the overlay layer 818. Once the last photo button 812 has been released, (or if the last photo button toggle is off) at step 764, the last photo edge stencil is then displayed again in the overlay layer 818.

Figure 7B:
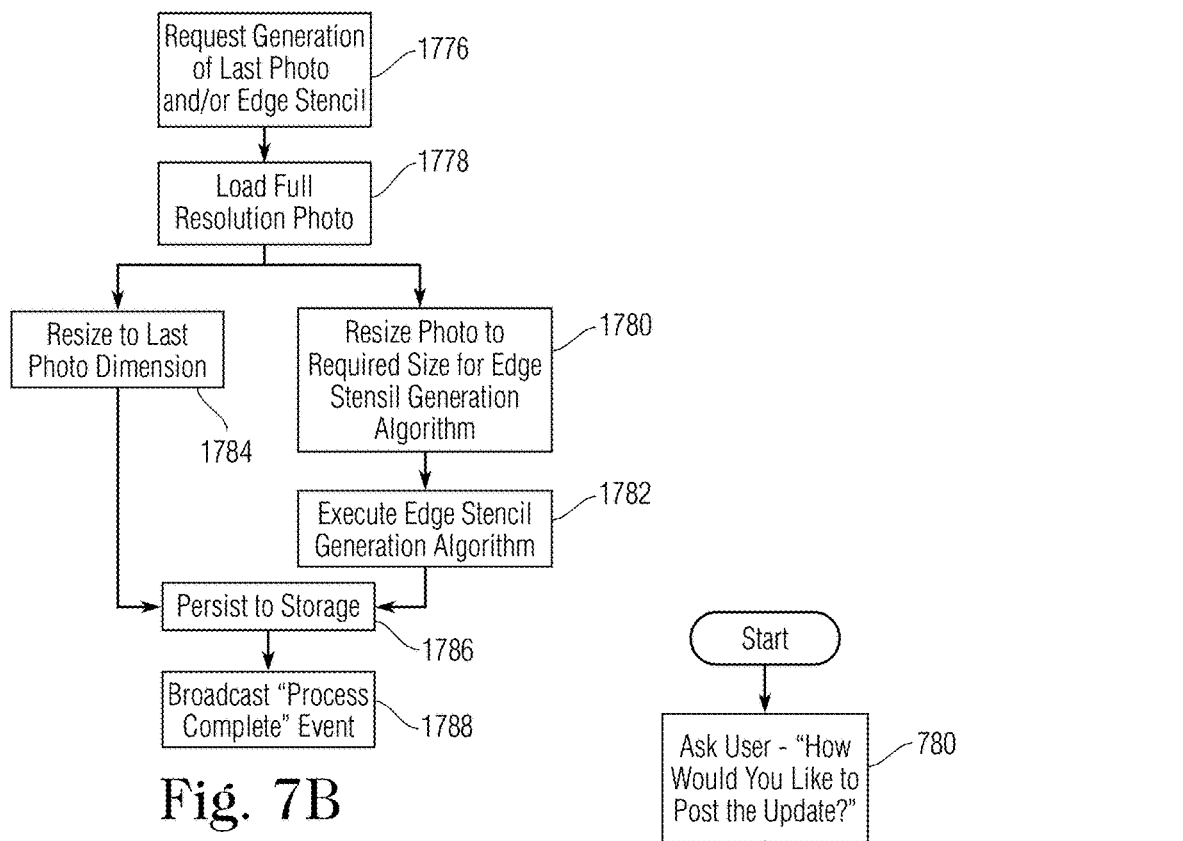
FIG. 7b is a flow diagram depicting a process when the last photo and edge stencil does not exist, according to an example of the present disclosure.

If the last photo and edge stencil do not exist, then, at step 761, the process needs to wait until the last photo or the edge stencil has been downloaded or has to be locally generated. Referring to FIG. 7b, to generate a last photo or the edge stencil, at step 1776, a request is received to generate a last photo and/or edge stencil. At step 1778, a full resolution photo is loaded and, at step 1780, the photo is resized for generating an edge stencil. At step 1782, to generate the edge stencil, an algorithm is applied. Several types of algorithm can be using, including, but not limited to Canny Edge or Sobel Edge. It is also possible to produce more visually prominent alignment edges, with fewer unneeded artifacts, via deep learning using Convolutional Neural Networks. This process provides the user with stronger points of alignment, thus, allowing for easier and faster capture of the aligned photo. Additionally, at step 1784, the photo is resized to the last photo dimension, which can be dictated by the expected pixel dimension of the viewfinder in order to optimize photo quality, storage space, and data transmission speed. In an example, the process of resizing the last photo dimension (step 1784) can occur simultaneously as the processes of resizing the photo to the required size for edge stencil generation algorithm (step 1780) and executing the edge stencil generation algorithm (step 1782). In an alternative example, step 1784 can occur before or after steps 1780 and 1782. At step 1786, the resized photo having edge stencil is stored and, at step 1788, the process is completed. The stencil information may also be stored as a set of vectors. This allows a high resolution reproduction in the overlay layer, reduces storage space, and allows easier replacement of edge line color based on the current viewfinder image's color palette to maximize contrast.

While the steps relating to the last photo and stencil edge is being processed, at step 752, the image capturing device determines if the shutter button is pressed, for example, once the user has aligned the vantage point with the various alignment tools. As a result, at step 754, the captured image is saved locally to a storage device and can later be uploaded to a server. At step 756, if there are multiple viewpoint directives to capture, at step 758, a viewpoint directive index can be implemented. If the index is at the last position and viewpoint directives are still available to capture, the index can be moved to an available place in a list. If all of the viewpoint directives are captured, then the photo session capture is complete and the session data is saved to the project entity, at step 768. At step 770, the processor can provide the option of summarizing the photo session. If the user elects to summarize the photo session, at step 772, the photo session can be summarized. If the user decides not to summarize the photo session, then, at step 774, the data can be stored.

Figure 7C:
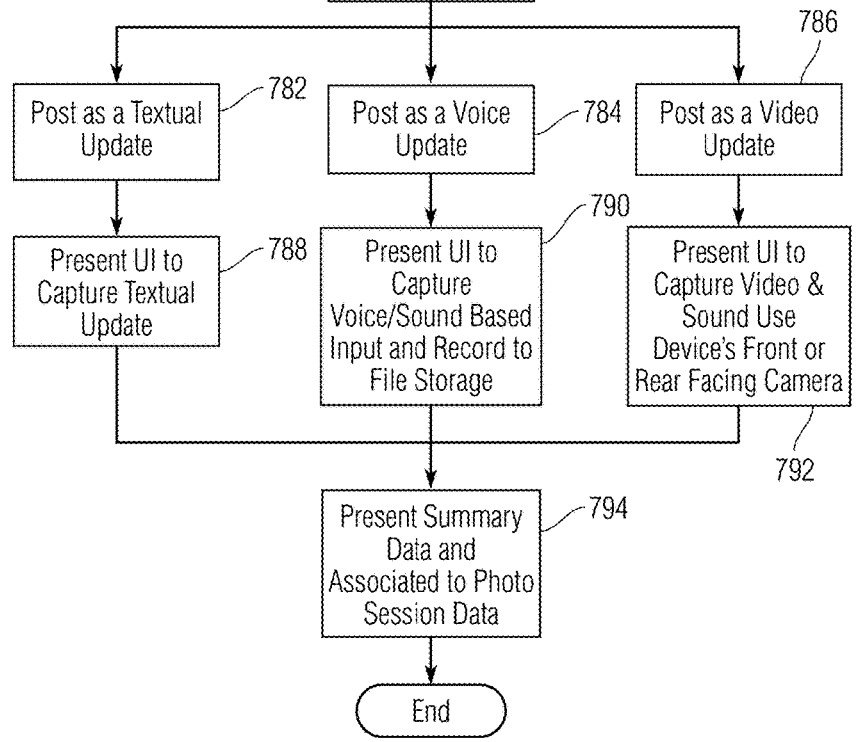
FIG. 7c is a flow diagram depicting the photo session summary process in which details summarizing the previously captured photo session via various media, according to an example of the present disclosure.

FIG. 7c illustrates an exemplary process of capturing a summary of the previously captured photo session, via a textual note, a voice recording, or a video. At step 780, the user can be prompted with three choices and a specific user interface can be presented to capture the summary. The three choices can include textual update 782, voice update 784, and video update 786. If the user selects the textual update 782, then at step 788, an interface can appear to include a text entry box and a save button. Alternatively, if the user selects the voice update 784, then at step 790 a user interface accessing the image capturing device's sound recording subsystem can be displayed. This can, at minimum, include a button to start and stop the recording. Additionally, the user interface can be a save button to save the result. If the user selects the video update 786, then at step 792, the user interface allowing access to all available video camera sensors (i.e., front/back) can be displayed. A video viewfinder element can also be displayed in the user interface displaying the video feed. This can, at minimum, include a button to start and stop the recording along with a button to save the result. In each option (i.e., the textual update 782, the voice update 784, or the video update 786) at step 794, the user can initiate saving the result. Accordingly, the summary data is associated with the photo session data and persisted to the platform.

Figure 8B:
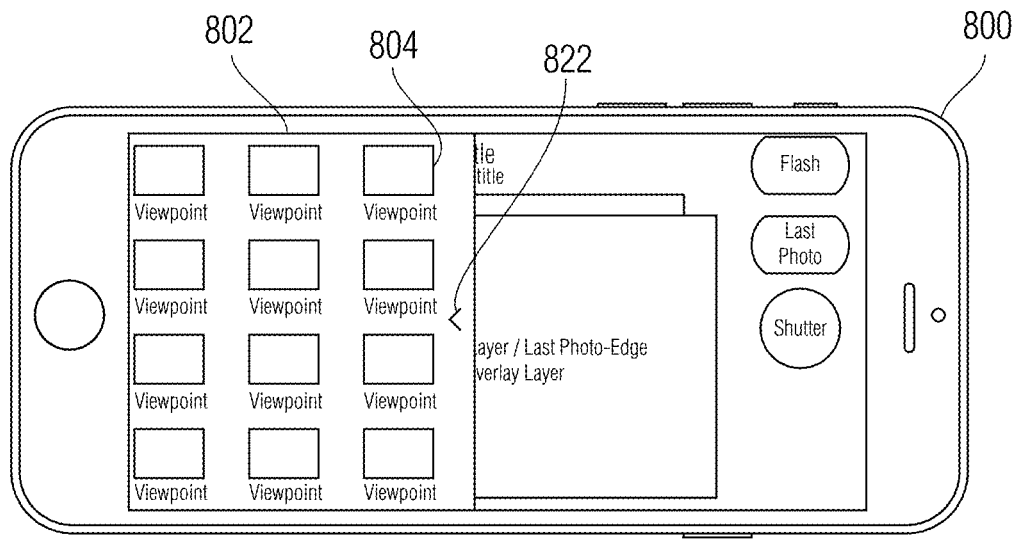
FIG. 8b is a screenshot showing all of the user interface elements utilized during the photo capture process, with an expanded viewpoint directive drawer in an expanded state, according to an example of the present disclosure.

FIG. 8a is a diagram illustrating a user interface of an image capturing device 800 having a number of elements. The user interface can be a viewpoint button drawer 802 that can act as a container holding one or more viewpoint buttons 804. The viewpoint button drawer 802 can be in a collapsed form as shown in FIG. 8a or in an expanded form, as shown in FIG. 8b. Each of the viewpoint buttons 804 can visually represent a viewpoint directive and can allow a user to select a viewpoint directive to be active during photo capturing session. The title of the viewpoint directive can be displayed below each of these viewpoint buttons 804. The title 806 can display the title of a particular viewpoint directive. The subtitle 808 can display the subtitle of a particular viewpoint directive associated with the title 806. The image capturing device 800 can also include a flash control button 810 that enables a user to cycle through various flash modes, such as automatic, on, off, and torch. The torch flash mode can allow the flash source to stay on continuously, allowing photography and vantage point alignment in low light conditions. The last photo button 812 toggles displaying the last photo within the overlay layer 818. The opacity of the last photo overlay can be controlled through the slide button 820, which allows opacity through a range of values. Alternatively, if the screen is a pressure sensitive screen, then instead of the controlling the opacity by the slide button 820, the opacity can be controlled by pressing on the screen. The shutter button 814 can be used to initiate capturing an image that is associated to the current viewpoint directive. The viewfinder layer 816 can display frame by frame video feed from the camera sensor. The overlay layer 818 can display the edge stencil image or last photo image when applicable. It can also not display an image.

FIG. 8*b* is a diagram showing the same interface as in FIG. 8*a*, except with an expanded viewpoint button drawer 802, allowing the temporary display of more viewpoint buttons 804. The expand/retract button 822 can enable a user to switch between the two modes.

Figure 8C:
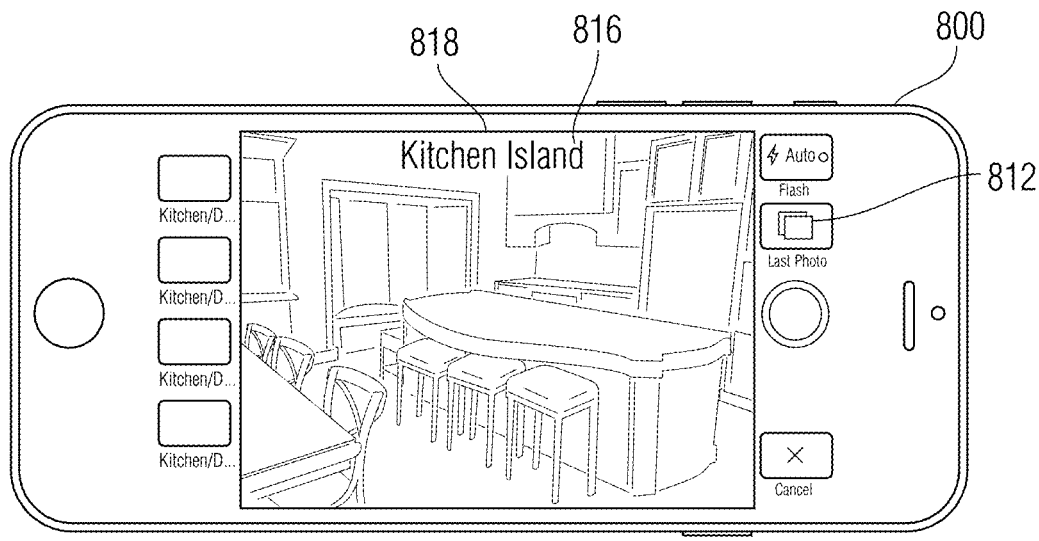
FIG. 8c is a screenshot showing the image capture last photo alignment tool in an inactive state with a live viewfinder, according to an example of the present disclosure.
Figure 8D:
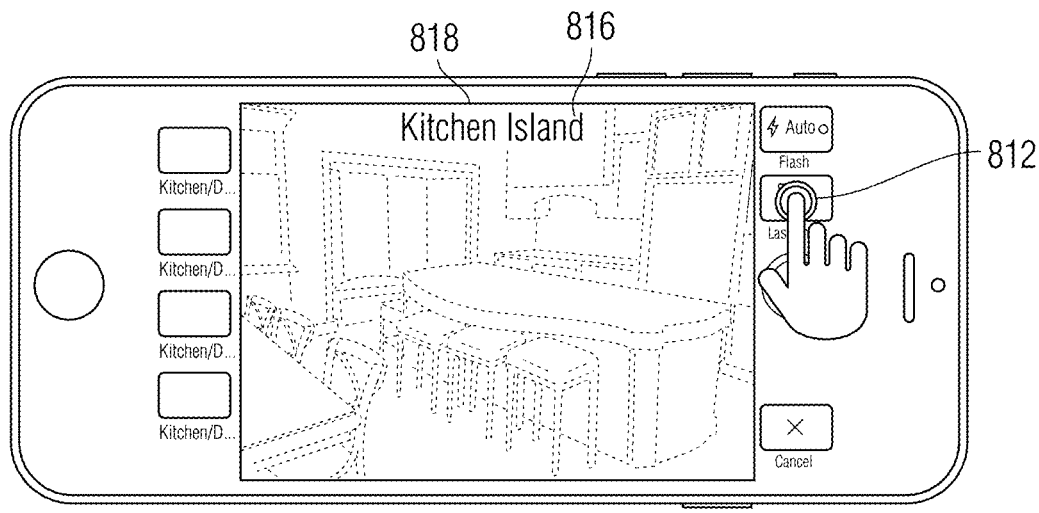
FIG. 8d is a screenshot showing the image capture last photo alignment tool in an active state with a live viewfinder, according to an example of the present disclosure.

FIG. 8*c* is a screenshot of an initial photo session for a project. As can be seen from the screenshot, the initial image of the photo session does not include an edge stencil or a last image displayed within the overlay layer. FIG. 8*d* is a screenshot a last photo within the overlay layer at a 50% opacity. This can be accomplished by the user pressing the last photo button 812. The viewfinder layer, below the overlay layer can display the camera video feed. Given that, in this example, the overlay layer is set to a 50% opacity, there can be a mixing of the two images. This allows the user to align both images in real-time, thus aligning the vantage point of the viewpoint directive.

Figure 8E:
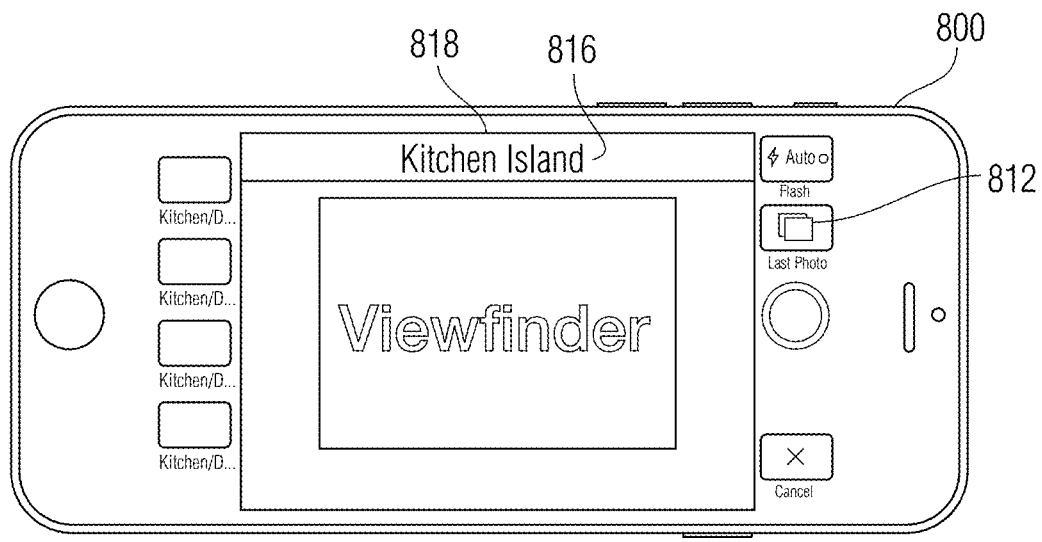
FIG. 8e is a screenshot showing the image capture last photo alignment tool in an inactive state, with generic placeholders, according to an example of the present disclosure.
Figure 8F:
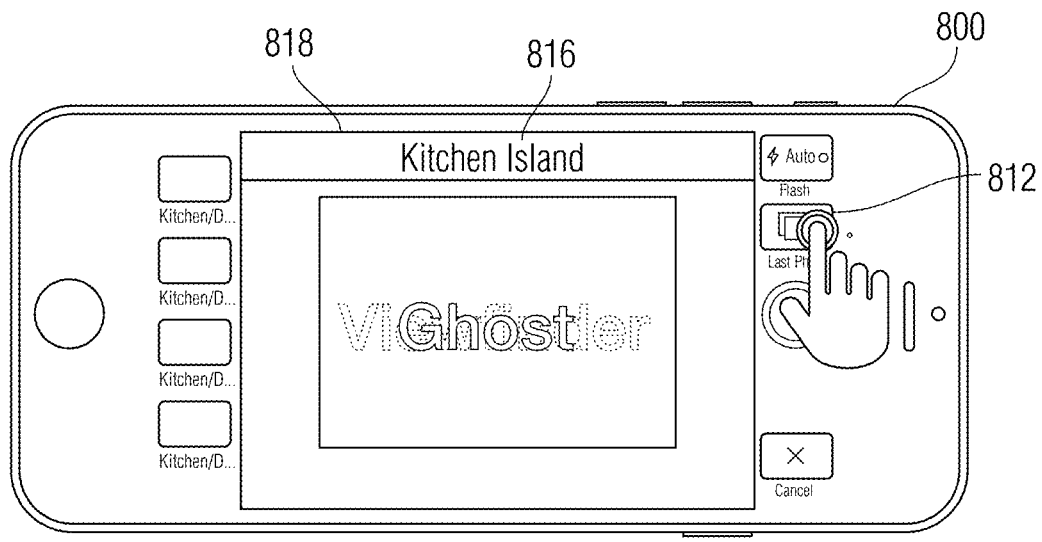
FIG. 8f is a screenshot showing the image capture last photo alignment tool in an active state, with generic placeholders, according to an example of the present disclosure.

FIG. 8*e* is an image of a user interface for capturing an image with no edge stencil or last photo displayed within the overlay layer. FIG. 8*f* is an image of a user interface when the user is pressing the last photo button 812. By pressing the last photo button 812, the image capturing device 800 can display a last photo within the overlay layer at a 50% opacity. The viewfinder layer, below the overlay layer can display the camera video feed. In this example, the overlay layer can be set to a 50% opacity, thus a mixing of the two images are possible, so that the user can align both images in real-time, thereby aligning the vantage point of the viewpoint directive.

Figure 8G:
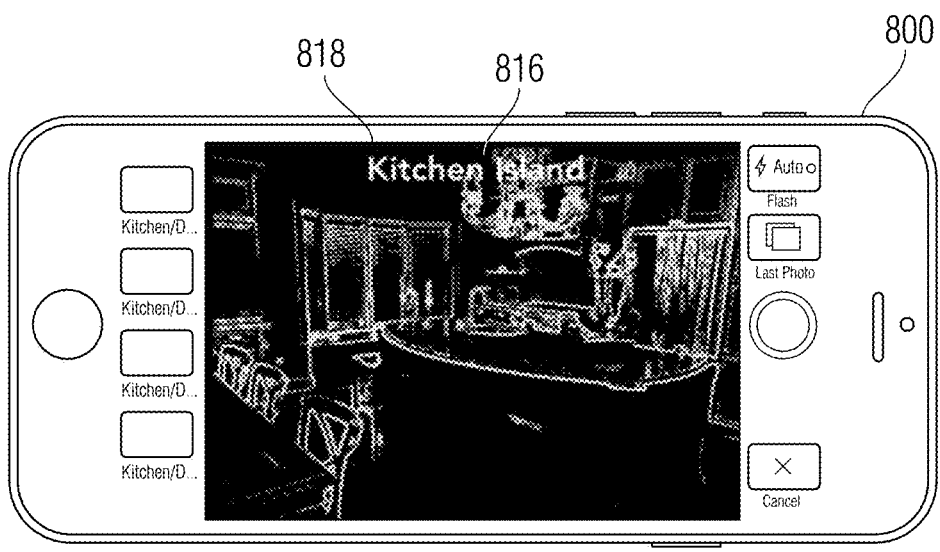
FIG. 8g is a screenshot showing the image capture last photo edge alignment tool in an active state, according to an example of the present disclosure.

FIG. 8*g* is a screenshot of a user interface displaying an edge stencil image generated from the previous photo session within the overlay layer at a 100% opacity. The viewfinder layer, below the overlay layer can display the camera video feed.

Figure 8H:
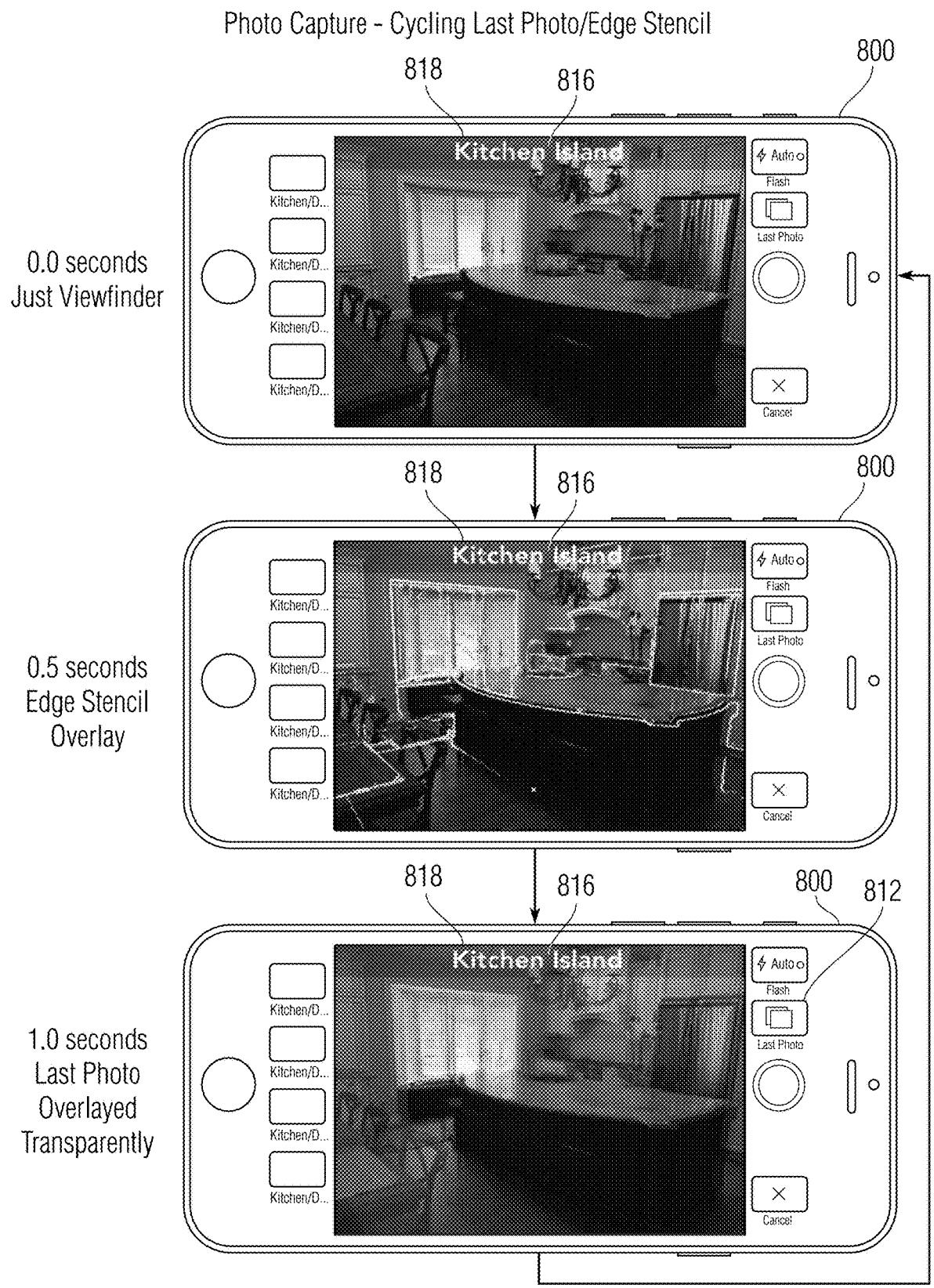
FIG. 8h is a set of screenshots showing the image capture last photo and the last photo edge being displayed in a cycled manner, according to an example of the present disclosure.

FIG. 8*h* is a diagram showing a method of aligning a vantage point by cycling the last photo session's edge stencil, last photo, and a clear viewfinder. Over a specific interval, for example 0.5 seconds, the cycle can initially begin with a clear overlay layer 818. After 0.5 seconds, the edge stencil image can be displayed within the overlay layer. After approximately another 0.5 seconds, the last photo can be displayed with an opacity of less than 100%. The cycle can then be repeated. This method allows a user to utilize hand-free alignment tools. Thus, allowing the user to focus on moving the image capturing device to the correct vantage point.

Figure 8I:
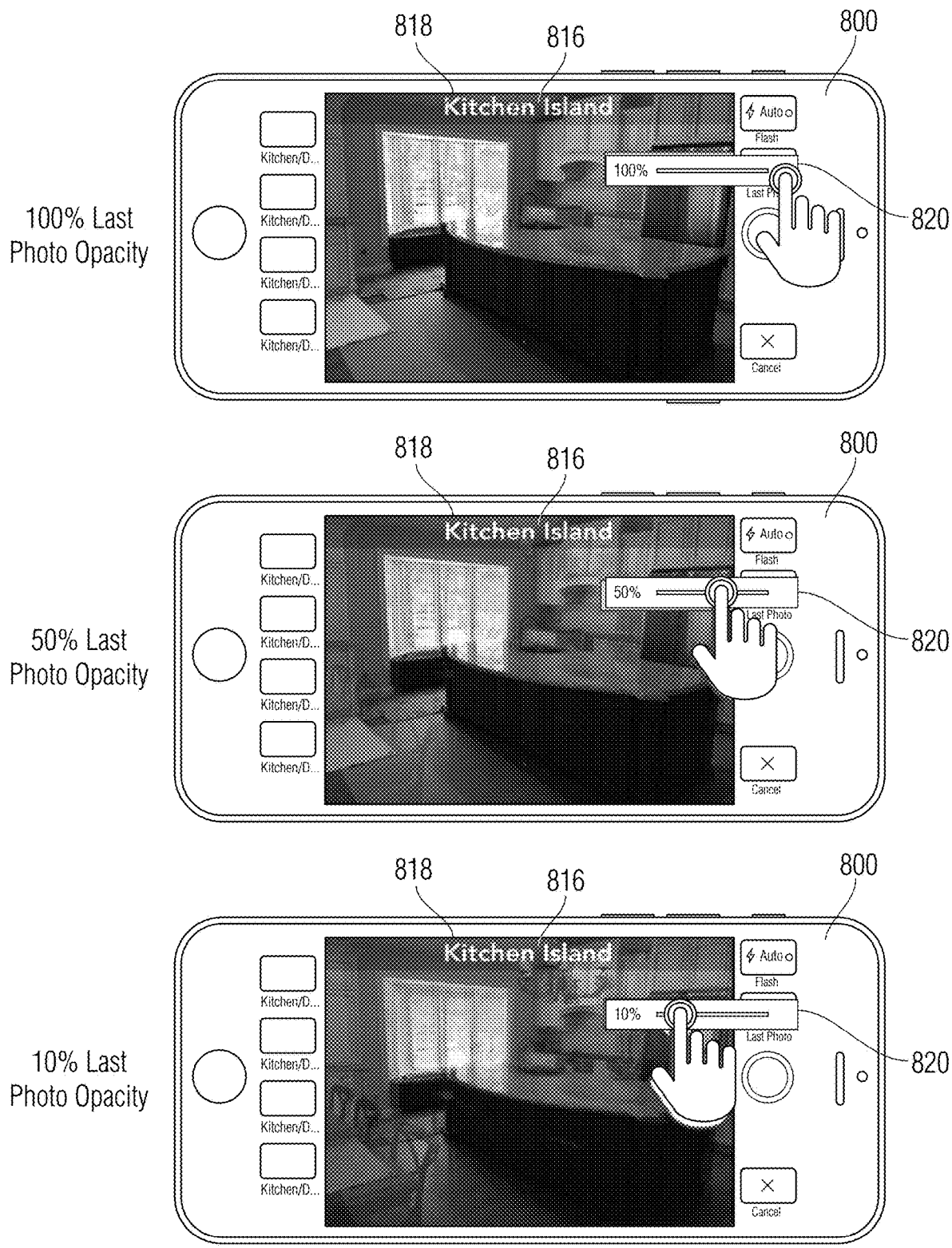
FIG. 8i is a set of screenshots showing user interface controls allowing manipulation of the opacity of the last photo alignment tool, according to an example of the present disclosure.

FIG. 8*i* is a diagram showing the opacity control for the last photo display. In one example, the user can control the opacity by first pressing the last photo button 812, and then sliding the slide button 820. In one example, the opacity can be changed by pressing the last photo button 812 and, at the same time, sliding the slide button 820 left/right to change the opacity level over the overlay layer 818 from a range of about 0-100%. In another example, the last photo button 812 can include a pressure sensor (i.e., the last photo button 812 is pressure sensitive). In this particular example, the user can adjust the opacity by changing his or her finger pressure/force on the last photo button 812. For example, a very light pressure/force can correspond to 0% opacity and a maximum pressure/force can correspond to 100% opacity. This particular design can provide nearly infinite opacity variability between 0% to 100%. Additionally, to make this particular design more usable, at the start and end of the opacity range, a threshold can be added. In another example, when the last photo button 812 is pressure sensitive, the opacity change can be inverted, such that a light touch/force corresponds to higher percent opacity and a high pressure touch/force corresponds to a lower percent opacity.

Figure 8J:
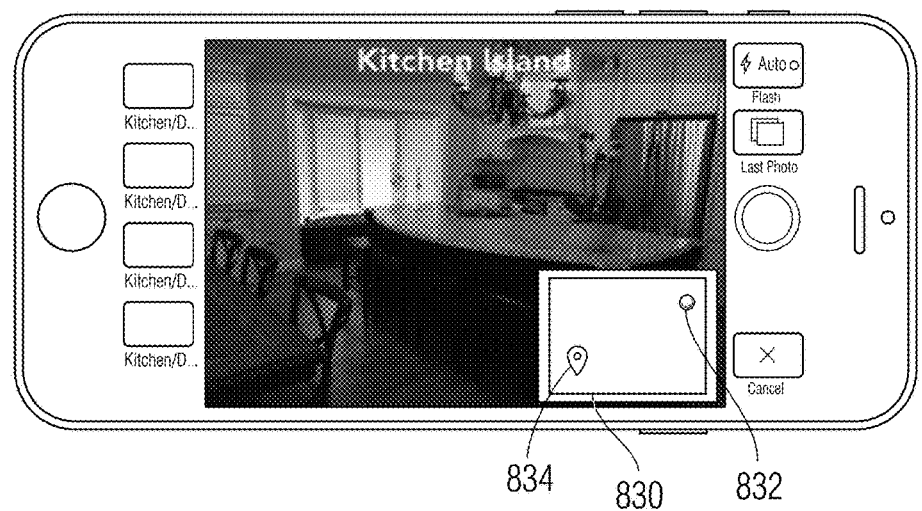
FIG. 8j is a screenshot showing the viewpoint directive locator alignment tool in a state where the user is not at the desired location, according to an example of the present disclosure.

FIG. 8*j* is a screenshot of an image capturing device showing the viewpoint directive location interface element 830 in which the user is not at the proper location. If a viewpoint directive contains the location coordinate information or a location sensor that can detect the location of the viewpoint directive, then a current location indicator 832 can be displayed in real-time. As the user moves about the project arena, the location indicator can move within the element. The viewpoint directive location indicator 834, can display the location in which the user must be situated in order to take a properly aligned photo, with the proper vantage point.

Figure 8K:
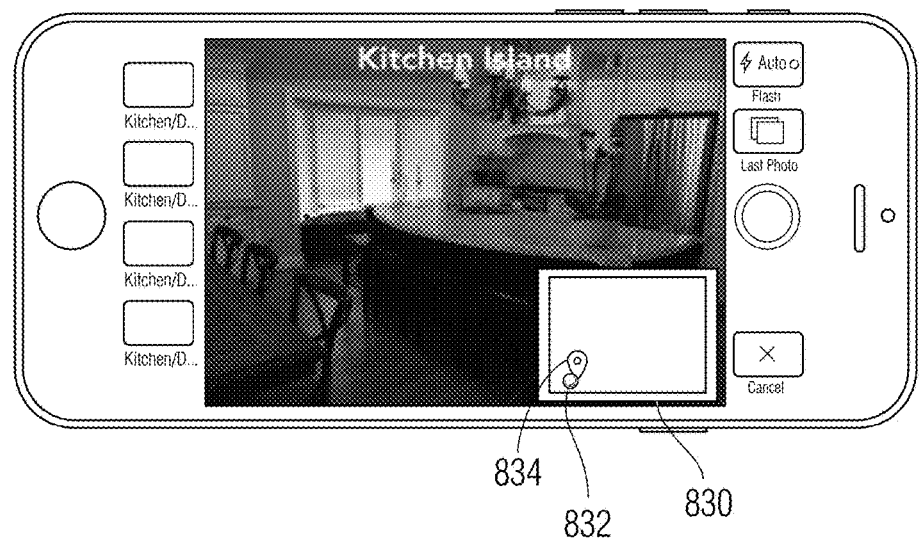
FIG. 8k is a screenshot showing the viewpoint directive locator alignment tool in a state where the user is at the desired location, according to an example of the present disclosure.

FIG. 8*k* is a screenshot that is substantially identical to FIG. 8*j*, but the user is now correctly situated within the project arena for the current viewpoint directive.

To review one of the array of images or videos, the user can make a gesture from a first position to a second position upon the screen, such as a touchscreen. Upon the detection of the motion from the first position to the second position, the video starts playing as the overlay layer starts to move from the current video being played to the next video in the cue.

A gesture can be physically touching a button, such as the fast forward button, physically touching the screen and moving a finger touching the screen (i.e., placing a finger on the screen and dragging the finger in the direction in which the user would like to move the content table), simply moving your hand from one position to a second position such that a camera on a device can detect the movement and interpret the movement.

In an embodiment, the speed of the gesture from the first position to the second position can act as a video frame range selector that results as to how fast the video will play its content. However, the speed of the gesture does not affect how fast the current video is being replaced by the next video in the cue. In another embodiment, the speed of the gesture will result in both the video playing faster and the current video being replaced by the next video in the cue faster. In yet another embodiment, a first gesture only plays the video and starts replacing the first video by the next video in the cue. Thus, a second gesture may be required to play the video in a faster speed, fast forwarding, or traversing the video.

In an embodiment, a substantially horizontal gesture can result in playing the video and, at the same time, replacing the video with a related video. For example, the first viewpoint is changed with a second viewpoint. In this embodiment, a substantially vertical gesture can result in laying the video and, at the same time, replacing the video with a non-related video. For example, a video of another project in the house. In another embodiment, a user can select a portion of the video that is of interest and play that preselected portion at a desired speed.

Figure 9:
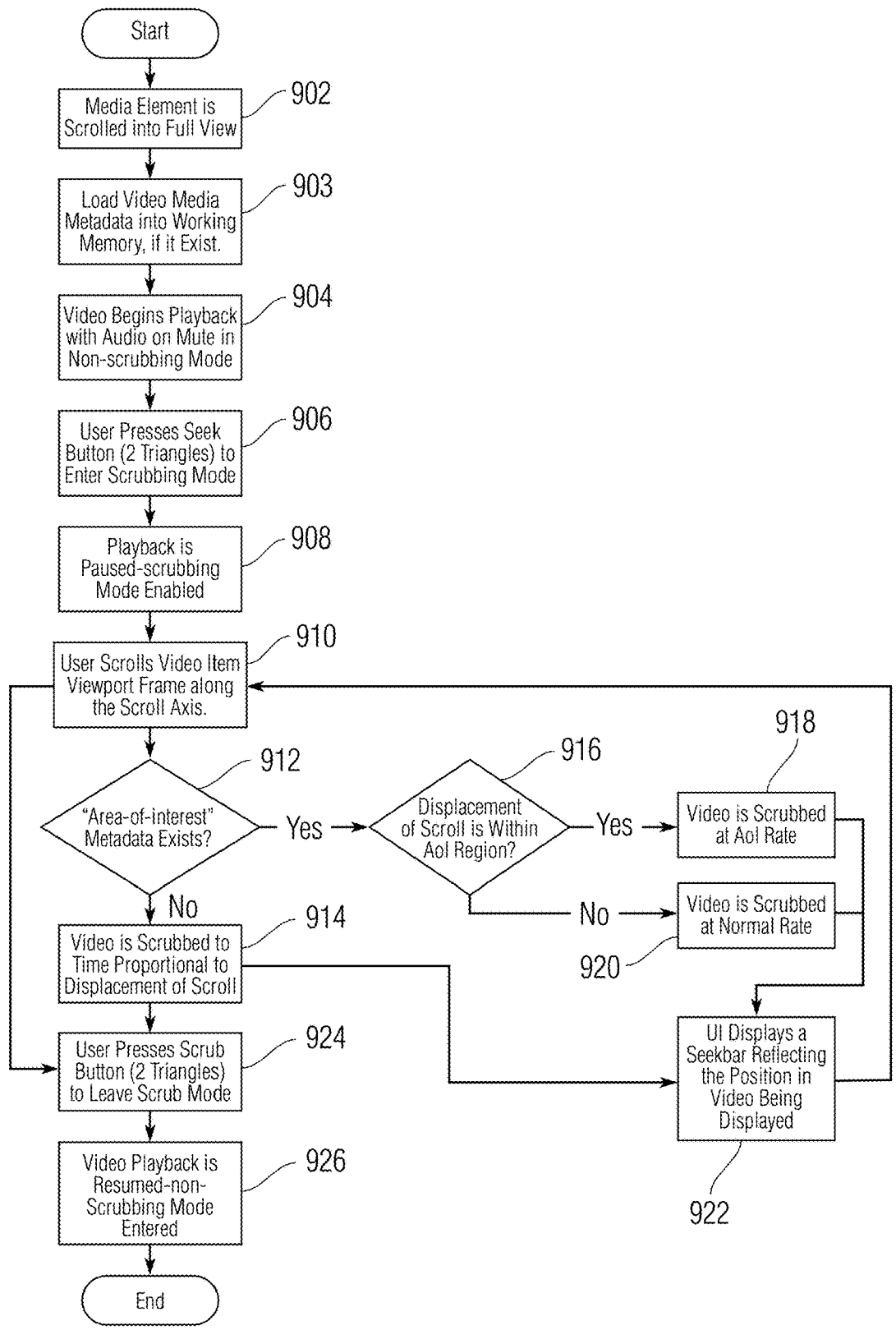
FIG. 9 is a diagram showing different states of the ScrollSeek interaction with a video.
Figure 10A:
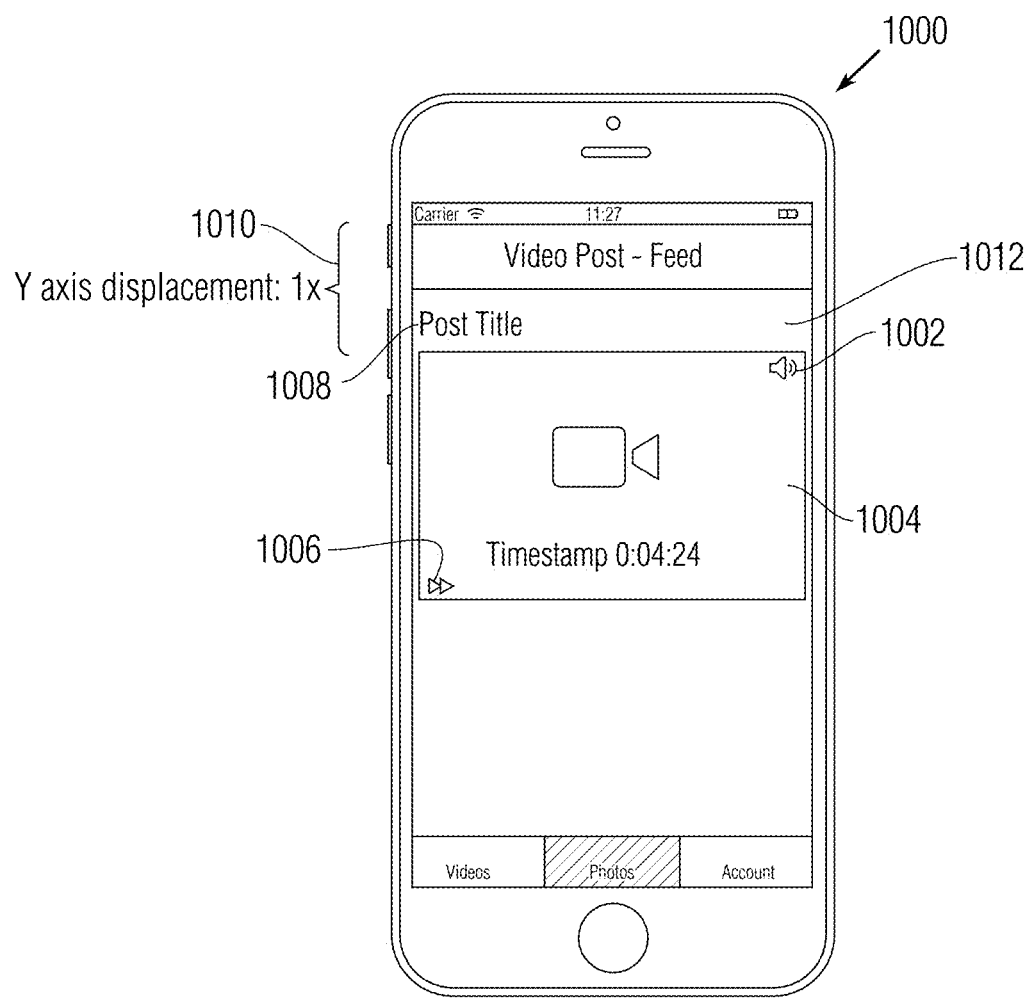
FIG. 10a is a screenshot showing the video ScrollSeek interface in which the method has no interaction with the video, according to an example of the present disclosure.

FIG. 9 is a flowchart showing exemplary steps in a program for a user to interact with a video interface. To start the process, at step 902, a media element, such as the video viewport can be scrolled into view. At step 903, a video media metadata can be loaded into a working memory. Once in the working memory and in full view, at step 904, the displayed video can begin playback. In one embodiment, the video playback is on mute in a non-scrubbing mode. However, the audio can also be unmuted based on a default setting. In an embodiment in which the video media can have associated metadata, the metadata can also be loaded into the memory at step 903. To enter the scrubbing mode (i.e., jump to various parts of the video) a user can press the seek button, at step 906. Generally, the seek button is visually indicated by a double triangle icon, such as seek button 1006 (also referred to herein as scrub button, or mode button), shown in FIG. 10*a*. By pressing the seek button 1006, at step 908, the playback can be paused and the scrubbing mode is enabled. In order to scrub the content, at step 910, the user can displace the position of a content frame 1004, shown in FIG. 10*a*, along the scroll axis. Referring to FIGS. 9 and 10*a*, in an exemplary embodiment, the scrubbing can only be in effect while the top and bottom edge of the content frame 1004 are visible within a viewport frame 1012. This ensures the content frame 1004 is fully visible while scrubbing the media.

The scroll displacement can either be linearly translated into a proportional time location within the video or it can translate non-linearly. At step 912, the user can determine the translation strategy based on whether the video's metadata can have any areas of interest. An area of interest would include a period of time within the video or a specific sequential set of images in photo sessions that are deemed to be interesting to the user. If an area of interest exists, then at step 916, it is determined if the displacement of scroll is within AoI region. If it is, then the content frame 1004 is scrolled into a time translated area of the video with the area of interest, at step 918, the sensitivity of the scrubbing can decrease to allow the user more fine-grained control of scrubbing. If at step 916, it is determined that the displacement of scroll is not within the AoI region, then the content frame 1004 is not scrolled into a time translated area of the video with the area of interest and, at step 920, the sensitivity of the scrubbing does not change and the scrubbing can continue at its normal rate. In an embodiment, the areas of interest can be selected by a media publisher, via a specific user interface for that purpose as shown in FIG. 10*i*. The areas of interest can also be selected by a software process based on historical user records, inferring the area based on density of scrubbing in the area(s). As the user scrubs through variable locations in the video, the user interface can display an indicator representing the time location. For example, at step 922, a line representing the total time and a dot representing the current time location can be displayed. The viewport frame 1012 can also update, in real-time, the static image frame of the video at the selected time location within the content frame 1004.

If the area of interest, at step 912, does not exist then at step 914, the video is scrubbed to time proportional to displacement of scroll and, at step 922, the UI can display a seek bar reflecting the position in the video being displayed. Again, the viewport frame 1012 can also update, in real-time, the static image frame of the video at the selected time location within the content frame 1004.

Once the user has found the desired location time of the video, at step 924, the scrub button 1006 can then be pressed once again to leave the scrubbing mode. At step 926, video playback can then be resumed.

FIG. 10*a* is a diagram depicting the scrolling mechanism and interface for a video. The device 1000 can have an interface having the viewport frame 1012 in a form of a scrollable table, usually translating position along the y-axis 1010. The data elements represented as video can be displayed in the content frame 1004. These data elements can be a label displaying the element's title 1008. The interface can also include a mode button 1006, which toggles the Scrubbing/Non-Scrubbing modes. Optionally the interface can be a sound on/off button 1002. FIG. 10*a* illustrates the interface in a Non-Scrubbing Mode.

Figure 10B:
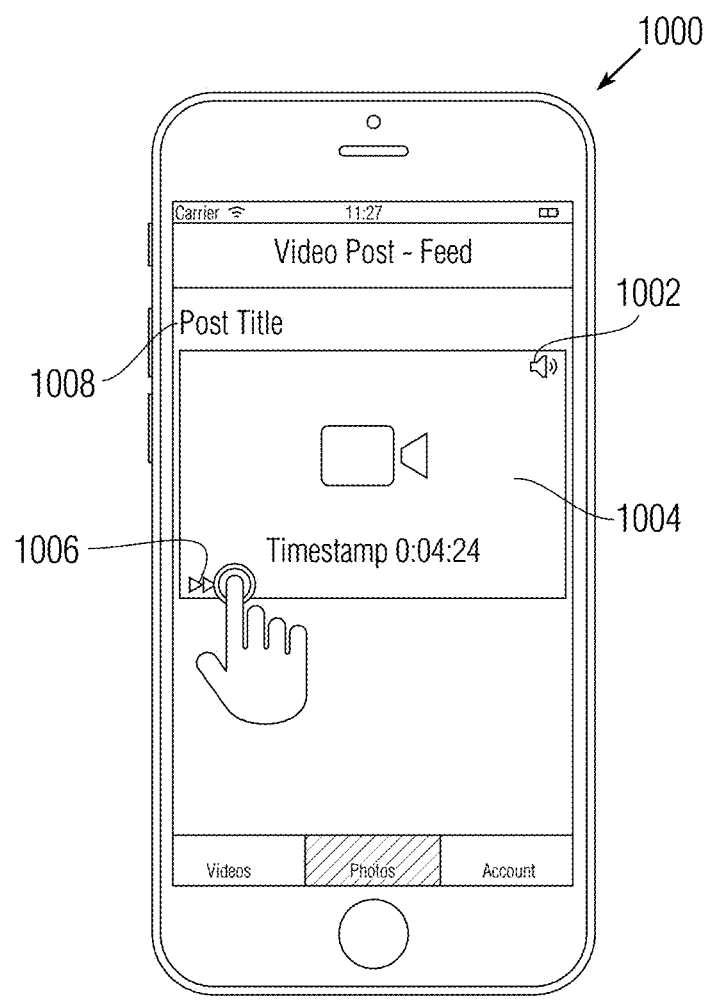
FIG. 10b is a screenshot showing the video ScrollSeek interface in which the user initiates a mode in which the ScrollSeek can control the video, according to an example of the present disclosure.
Figure 10C:
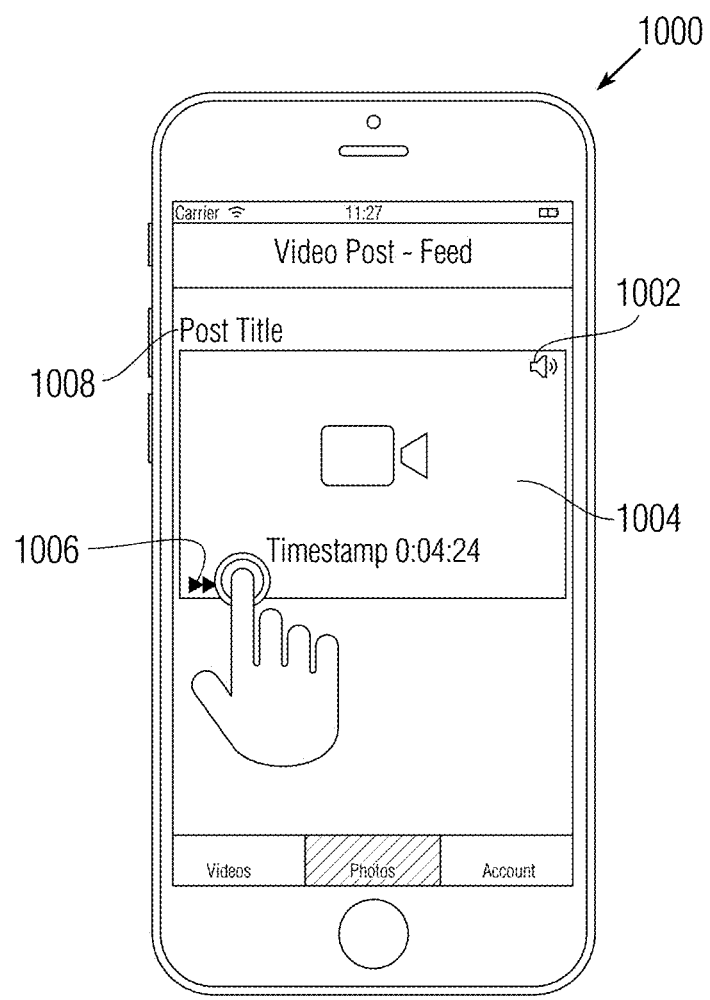
FIG. 10c is a screenshot showing the video ScrollSeek interface in which the user ends a mode in which the ScrollSeek can interact with the video, according to an example of the present disclosure.
Figure 10D:
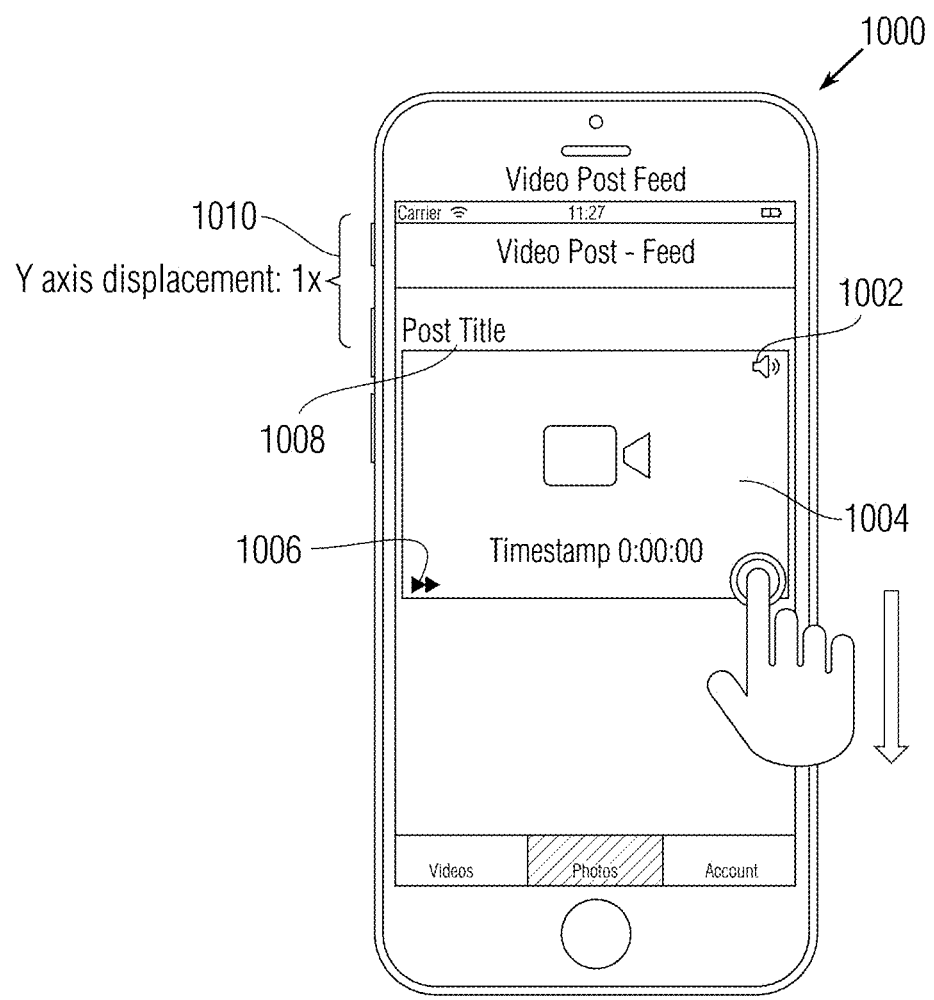
FIG. 10d is a screenshot showing the user utilizing the ScrollSeek interface to scrub to a specific exemplary time in the video, according to an example of the present disclosure.
Figure 10E:
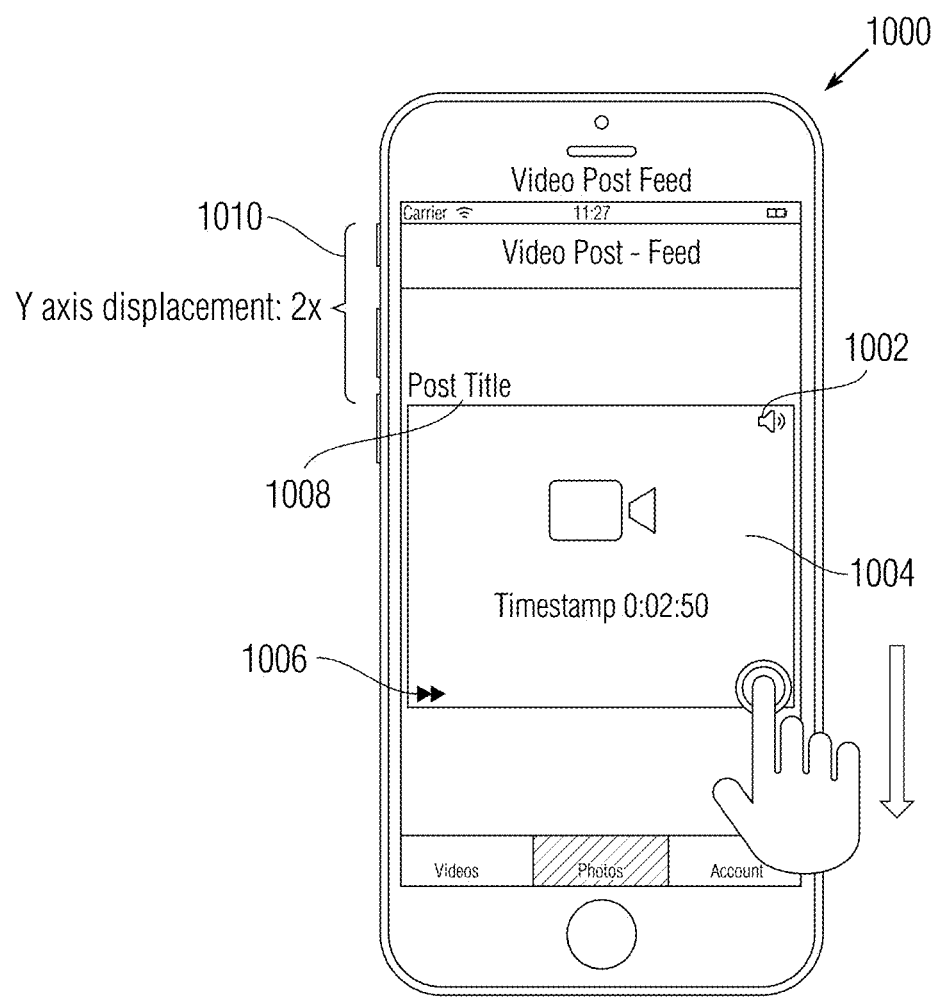
FIG. 10e is a screenshot showing the user utilizing the ScrollSeek interface to scrub to another specific exemplary time in the video, according to an example of the present disclosure.
Figure 10F:
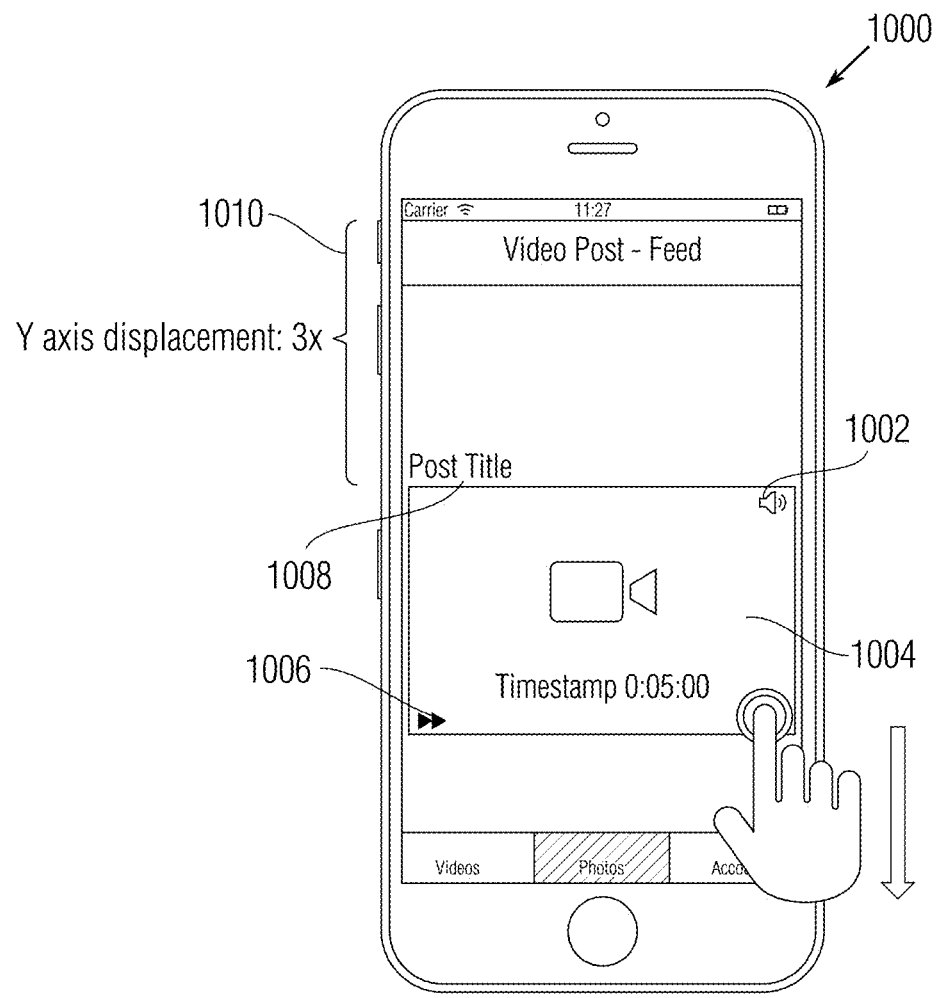
FIG. 10f is a screenshot showing the user utilizing the ScrollSeek interface to scrub to yet another specific exemplary time in the video, according to an example of the present disclosure.
Figure 10G:
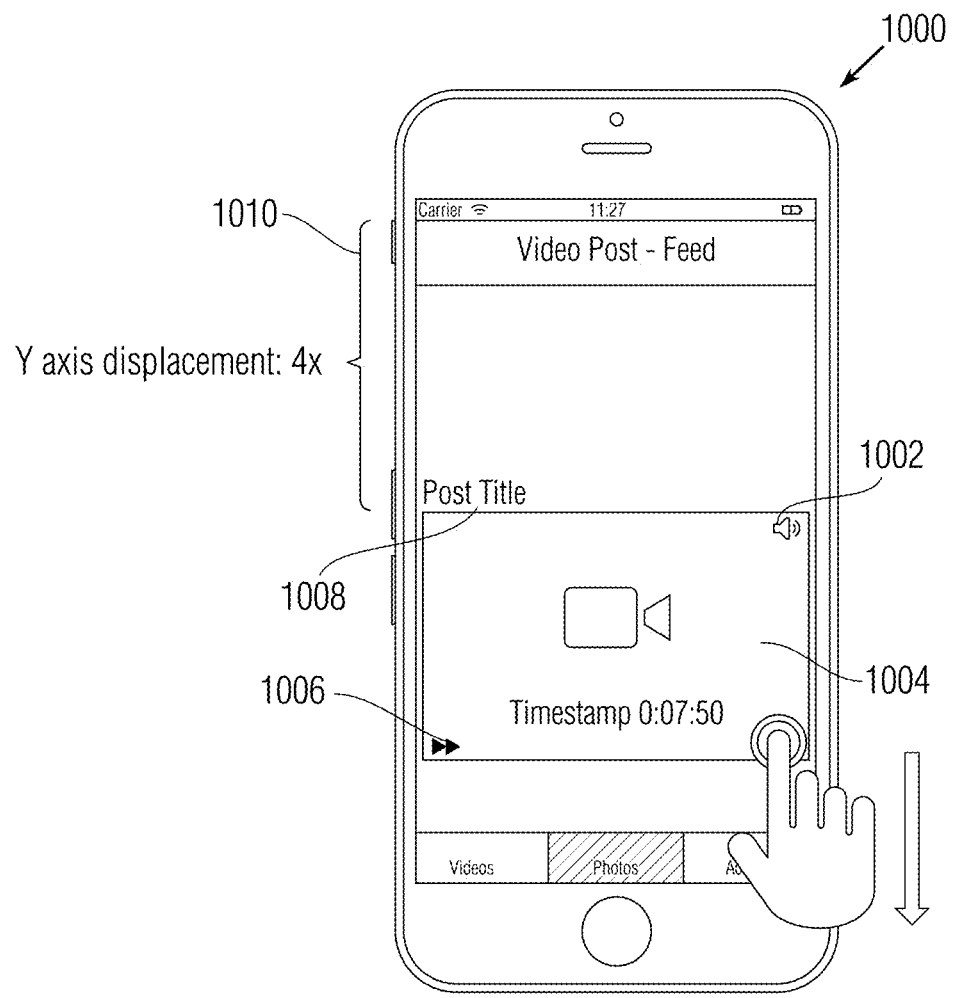
FIG. 10g is a screenshot showing the user utilizing the ScrollSeek interface to scrub to yet another specific exemplary time in the video, according to an example of the present disclosure.

To initiate scrubbing a video that is displayed in the content frame 1004, a user can press the mode button 1006, as shown in FIG. 10*b*. To switch to a non-scrub mode, the user can toggle the mode button 1006, as shown in FIG. 10*c*. As shown in FIG. 10*d*, to continue the playback of the video in the current content frame 1004, the user can touch the content frame 1004 or the outlying interface for the video and begin dragging the content frame 1004. This results in displacement of the content frame 1004 by 1 unit along the y-axis 1010. The 1 unit displacement can be accomplished by converting the displacement with a proportional time value within the video. As shown in FIG. 10*e*, the user is continuing to drag the content frame 1004, such that the displaced content frame 1004 is now displaced by 2 units. In this embodiment, the two-unit displacement corresponds to 2 minutes and 50 seconds of video time. As the user continues to drag the content frame 1004, as shown in FIG. 10*f*, the displaced content frame 1004 is further displaced. For example, in FIG. 10*f*, the content frame 1004 is displaced by 3 units, which corresponds to 5 minute of video time. This process can continue until the end of video has been reached. For example, as shown in FIG. 10*g*, the content frame 1004 is displaced by 4 units, which corresponds to 7 minutes and 50 seconds of video time.

Figure 10H:
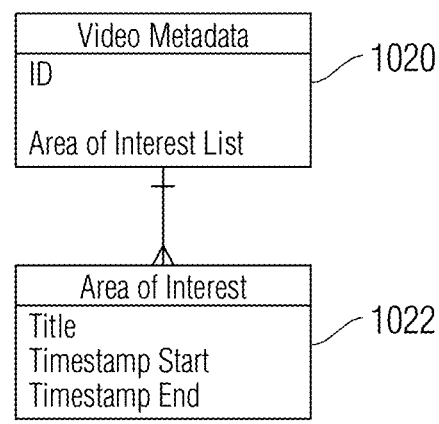
FIG. 10h is a diagram showing the video metadata and area of interest data entities, according to an example of the present disclosure.
Figure 10I:
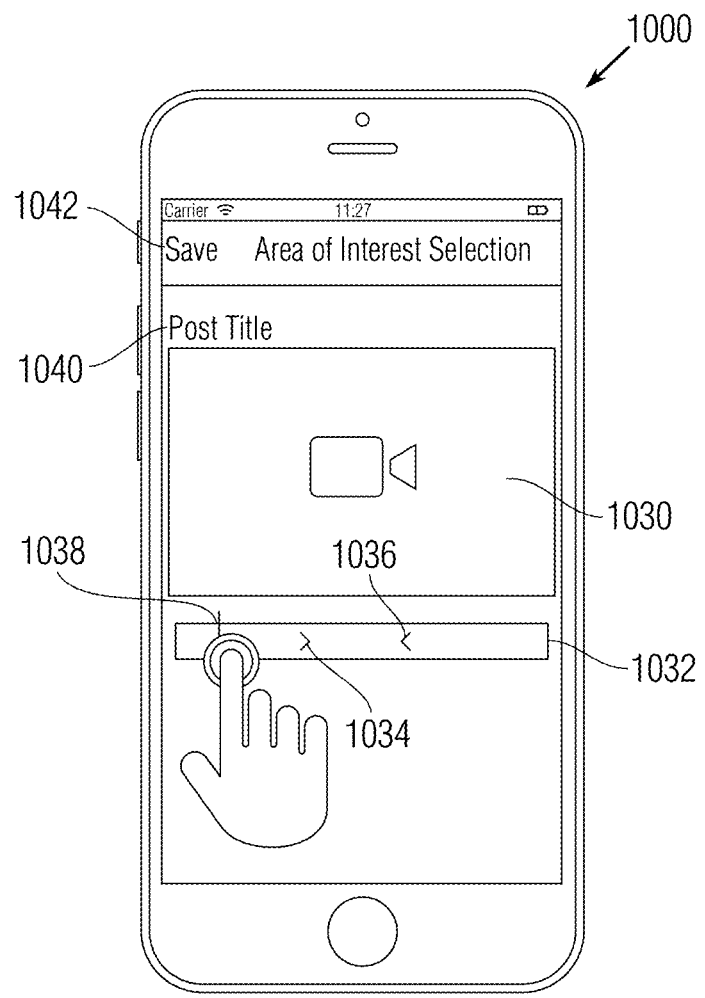
FIG. 10i is a screenshot showing a user interface that enables the user to edit a video's metadata, according to an example of the present disclosure.

As stated above, and as shown in FIG. 10*h*, the video can be a video metadata 1020 and one or more area of interest 1022.

FIG. 10*i* is a diagram showing a user interface that enables a user to edit a video's metadata, such as the title and area of interest portion of the video. Entry element 1040 enables the user to edit the title. The content frame 1030 can display the currently selected video frame. The seeking bar 1032 can visually represent a timeline of the video having indicator 1038 which can show the current video play time. A change in the position of the indicator 1038 through touch screen manipulation, can result in updating the currently displayed video frame within the content frame 1030. To select a portion of the video that can have a content of interest, the user can set the beginning of an area having the content of interest 1034 and the end 1036 by selecting the corresponding frame on the timeline. Once the timeline corresponding to the content of interest has been selected it can be saved by pressing the save button 1042 then persists the video metadata data to the platform.

Figure 11A:
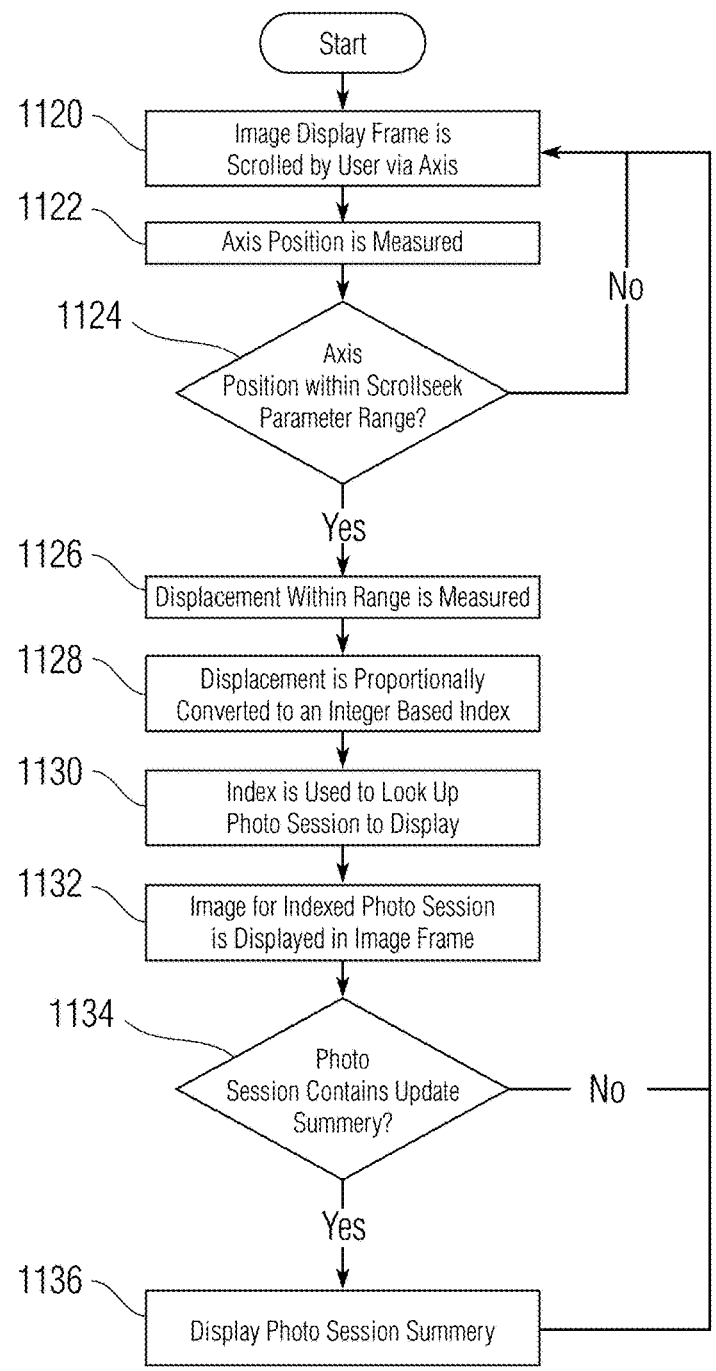
FIG. 11a is a flow diagram showing the process in which a user interacts with an image scroll feed utilizing the ScrollSeek, according to an example of the present disclosure.
Figure 11B:
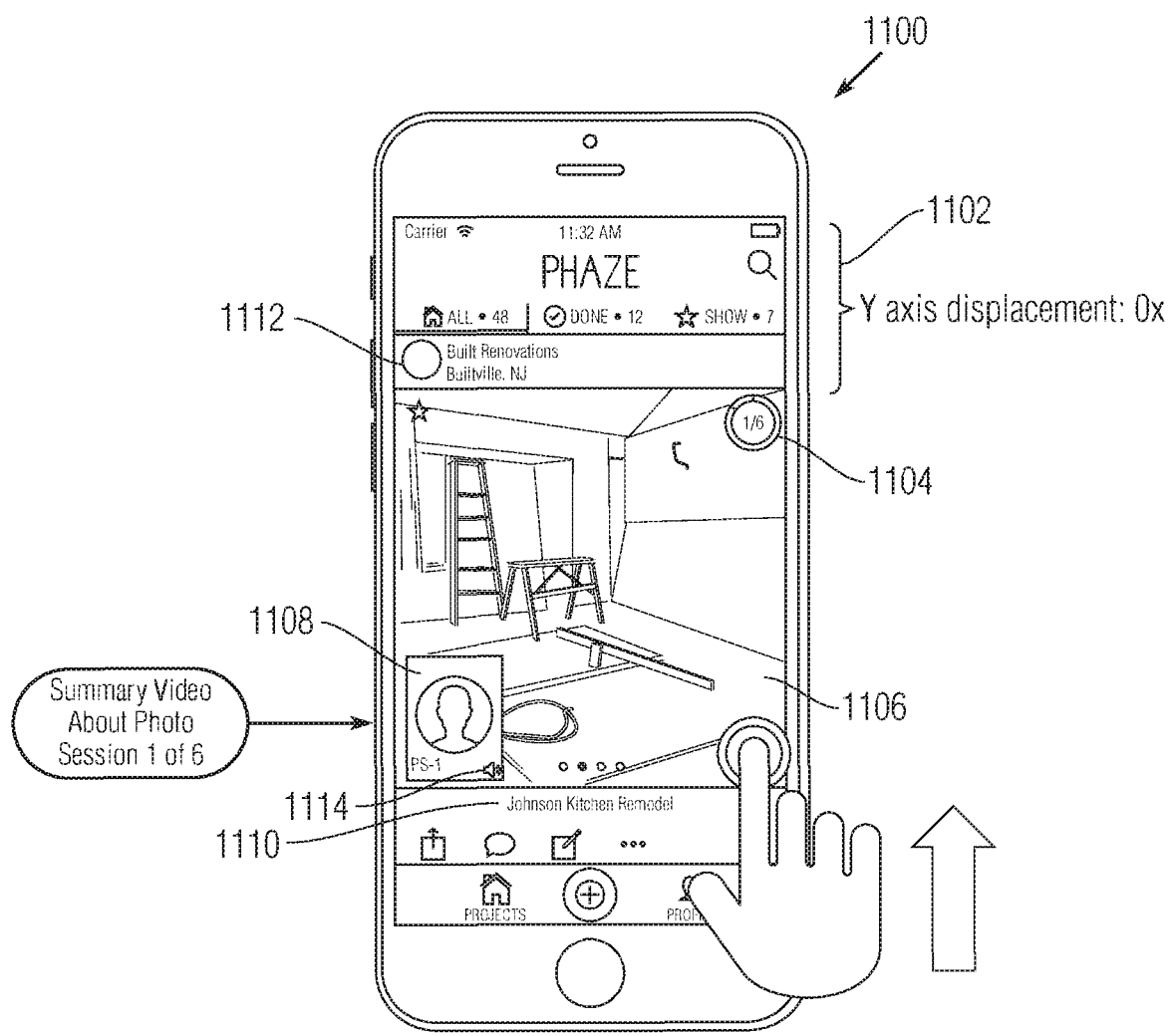
FIG. 11b-11g is a screenshot showing a user interacting with an image scroll feed utilizing the ScrollSeek method, displaying an example photo session 1 of 6 to 6 of 6, according to an example of the present disclosure.
Figure 12A:
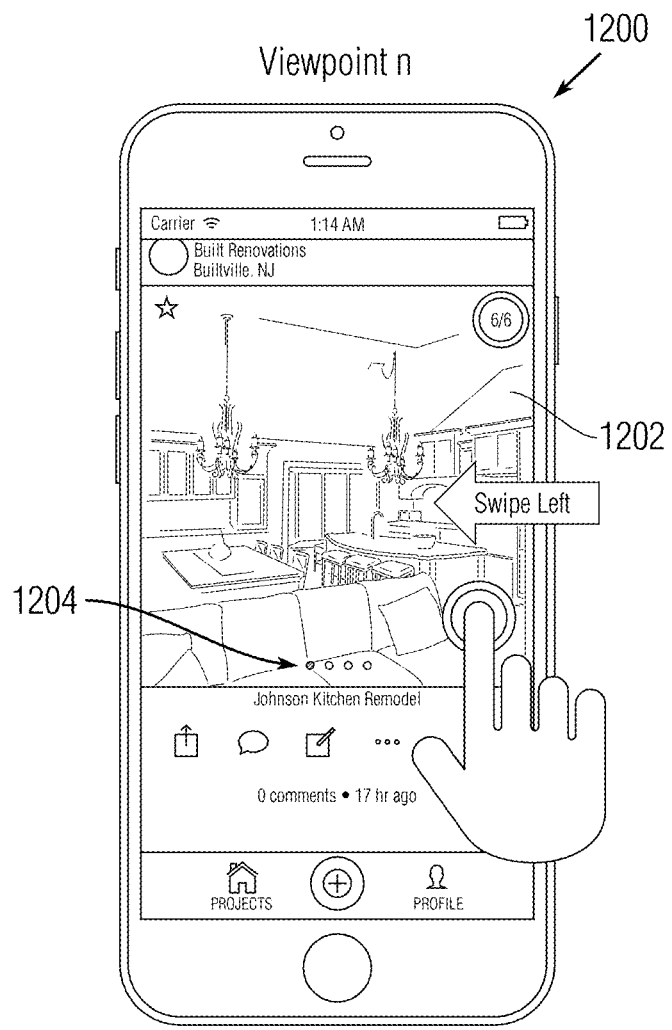
FIG. 12a is a screenshot showing a user interacting with an image scroll feed utilizing the ScrollSeek interface, changing the displayed viewpoint directive image for the current photo session, according to an example of the present disclosure.

The process of and the interface for scrolling through multiple photo session are shown in FIGS. 11*a* and 11*b*, respectively. The interface can be an array of images or videos (data elements) in a scrollable format. The array of data element can be scrolled or transitioned along the x-axis or the y-axis. In the embodiment shown in FIG. 11*b*, the array of data elements can transition along the y-axis, with the current data element displayed in the image viewport 1106 of the device 1100. Referring to FIG. 11*a*, at step 1120, the user can displace the position of the viewport along the variable axis of the frame. By displacing the position of the viewport, at step 1122, the axis displacement changes can be calculated in real-time. At step 1124, the interface program can determine if the axis location is within a measured range. In an embodiment, when the axis location is within a measured range, the top and bottom of the data element can be visible within the display of the device. To scrub, at step 1126, the user can displace the position of the viewport frame along the variable axis of the frame. At step 1128, the displacement can be converted proportionally, via an algorithm, to an integer based index. At step 1130, the index can be used to lookup or reference a photo session to be displayed. The photo session can contain more than one viewpoint photo. The viewpoint photo within the selected photo session can be selected via a separate interface element as shown in FIG. 12*a*. Once the correct photo is referenced, at step 1132, it photo is displayed via the image viewport 1106. At step 1134, the user can confirm that the photo session contains the updated summary. If it is not confirmed, the process can start over again. However, if it is confirmed, then at step 1136 the photo session summary can be displayed.

Referring to FIG. 11*b*, the interface can be array of data element, usually translating position along the y-axis 1102. The current data element can be displayed in the image viewports 1106 of the device 1100. These data elements can have a label displaying the element's title 1112 and subtitle 1110. Optionally, it can have a photo session summary inset interface element 1108. The photo session summary inset interface element 1108 can enable the displayed video to include a sound control button 1114, audio with sound control button, or a label displaying a textual summary. If a video with sound or just audio constitutes the summary, the sound control button 1114 can activate or deactivate the sound. Additionally, if a video is available, it can start playing automatically along with associated sound. Optionally, a visual indicator 1104 can display the current photo session that is being actively displayed. As an example, in FIG. 11*b*, photo session 1 of 6 is displayed because displacement along the y-axis 1102 is at 0 units.

Figure 11C:
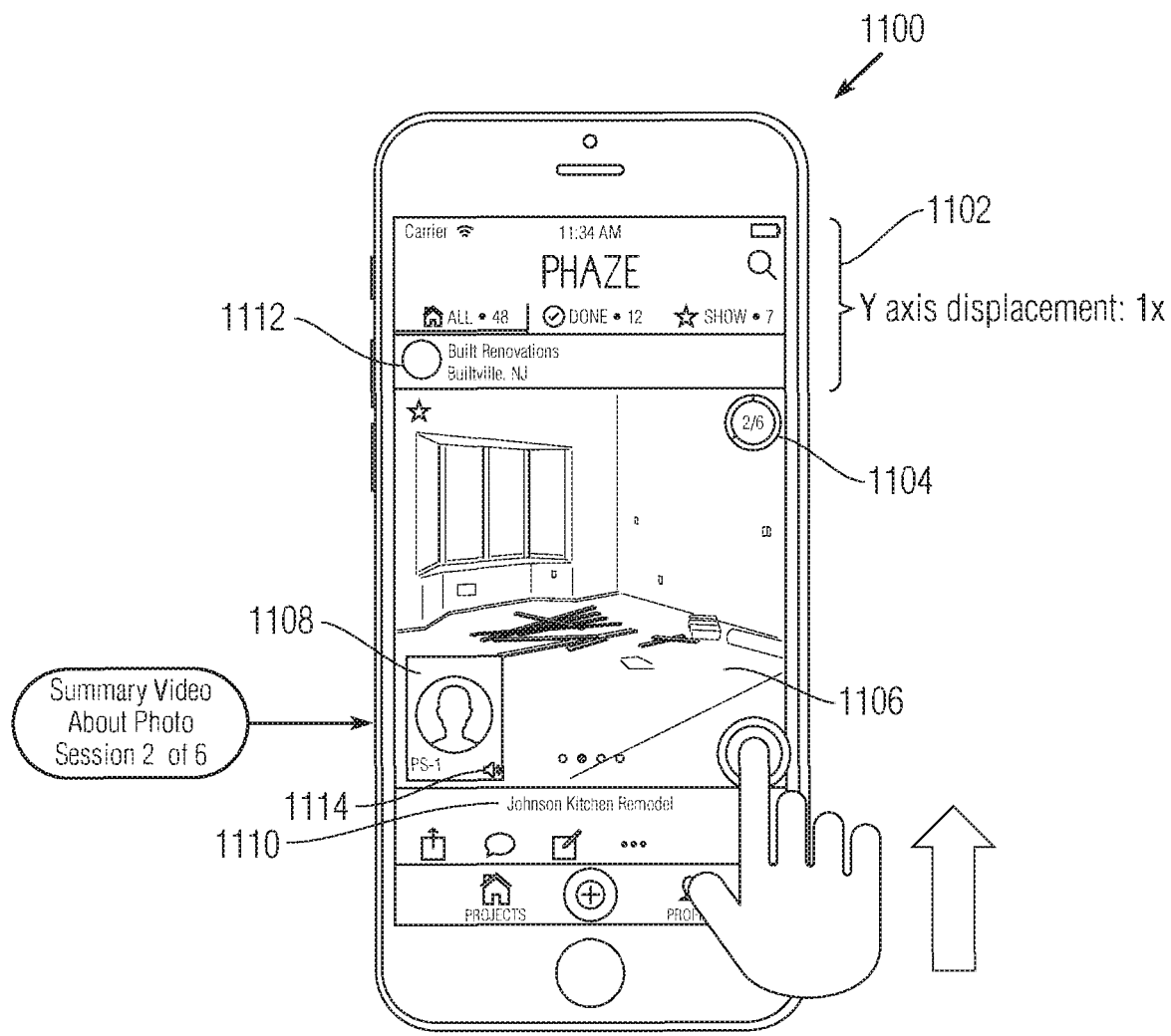
Figure 11D:
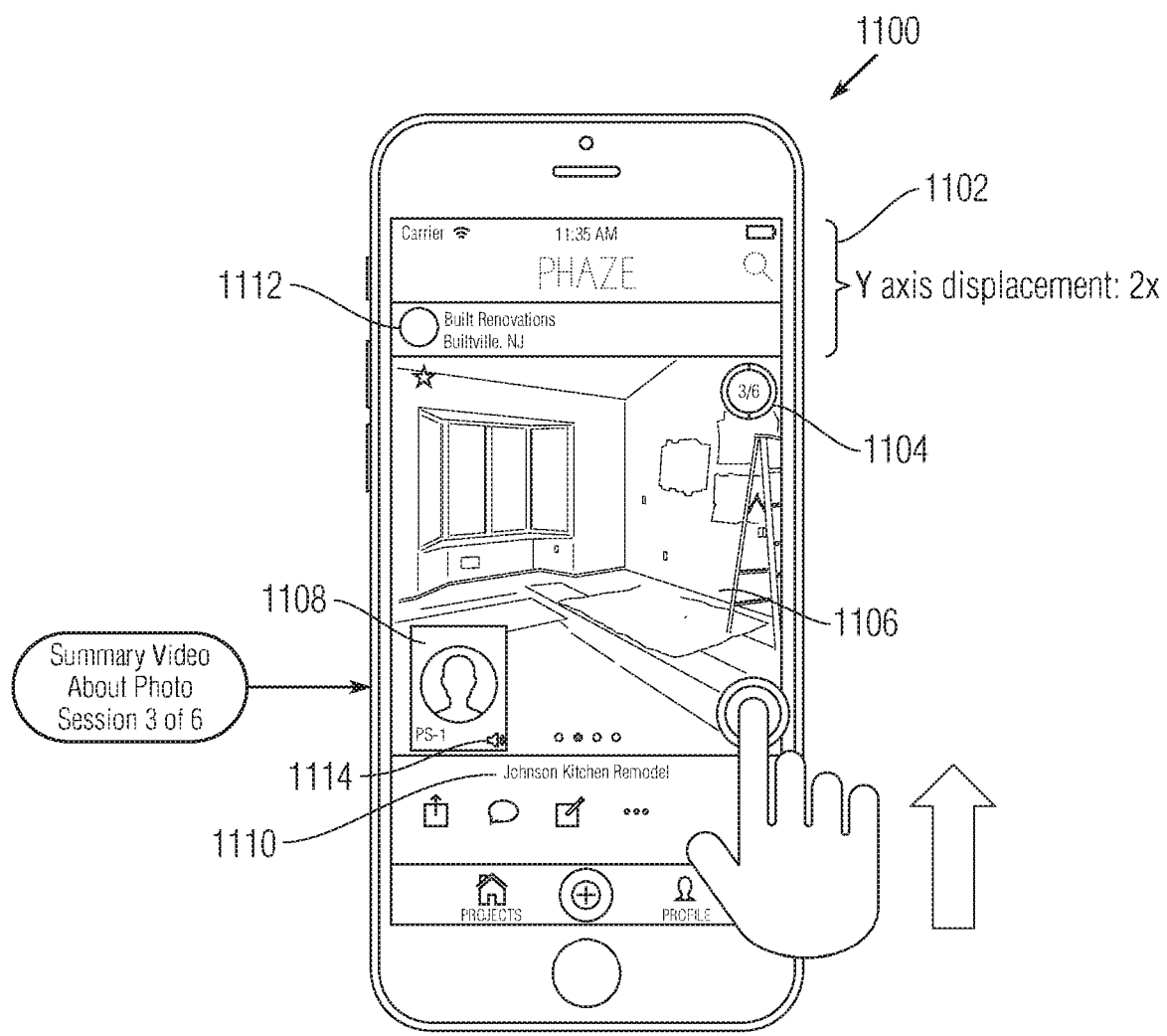
Figure 11E:
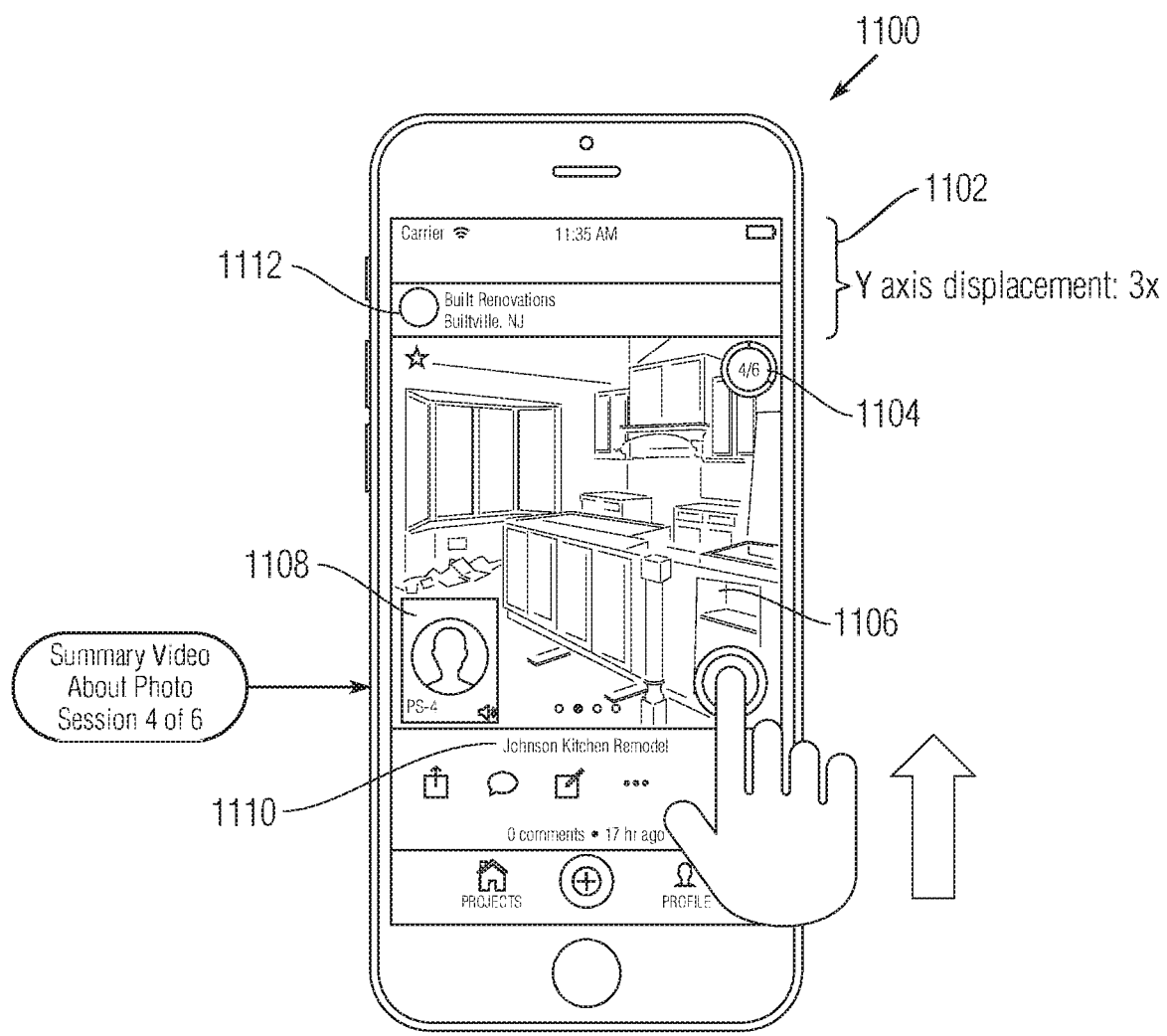
Figure 11F:
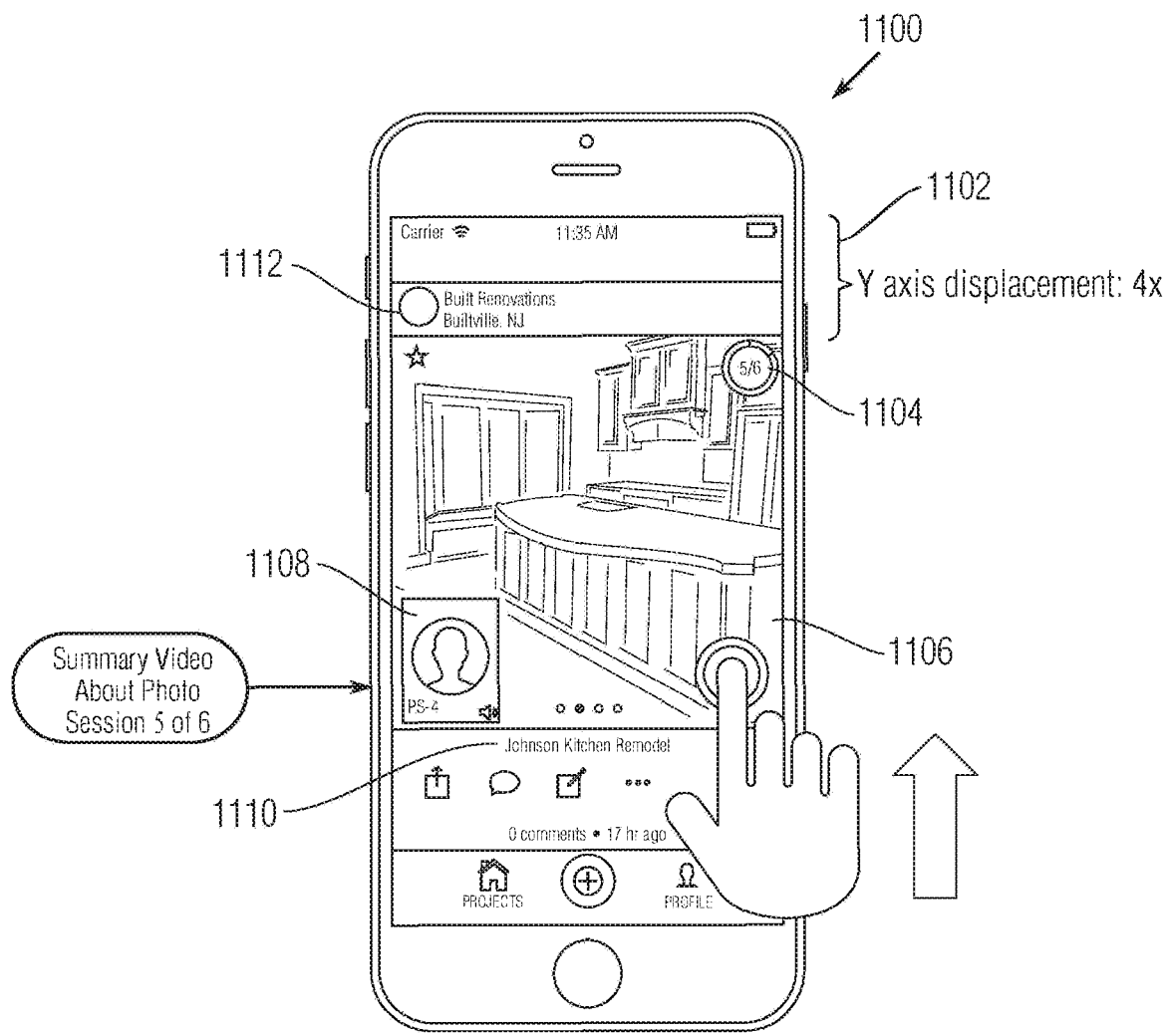
Figure 11G:
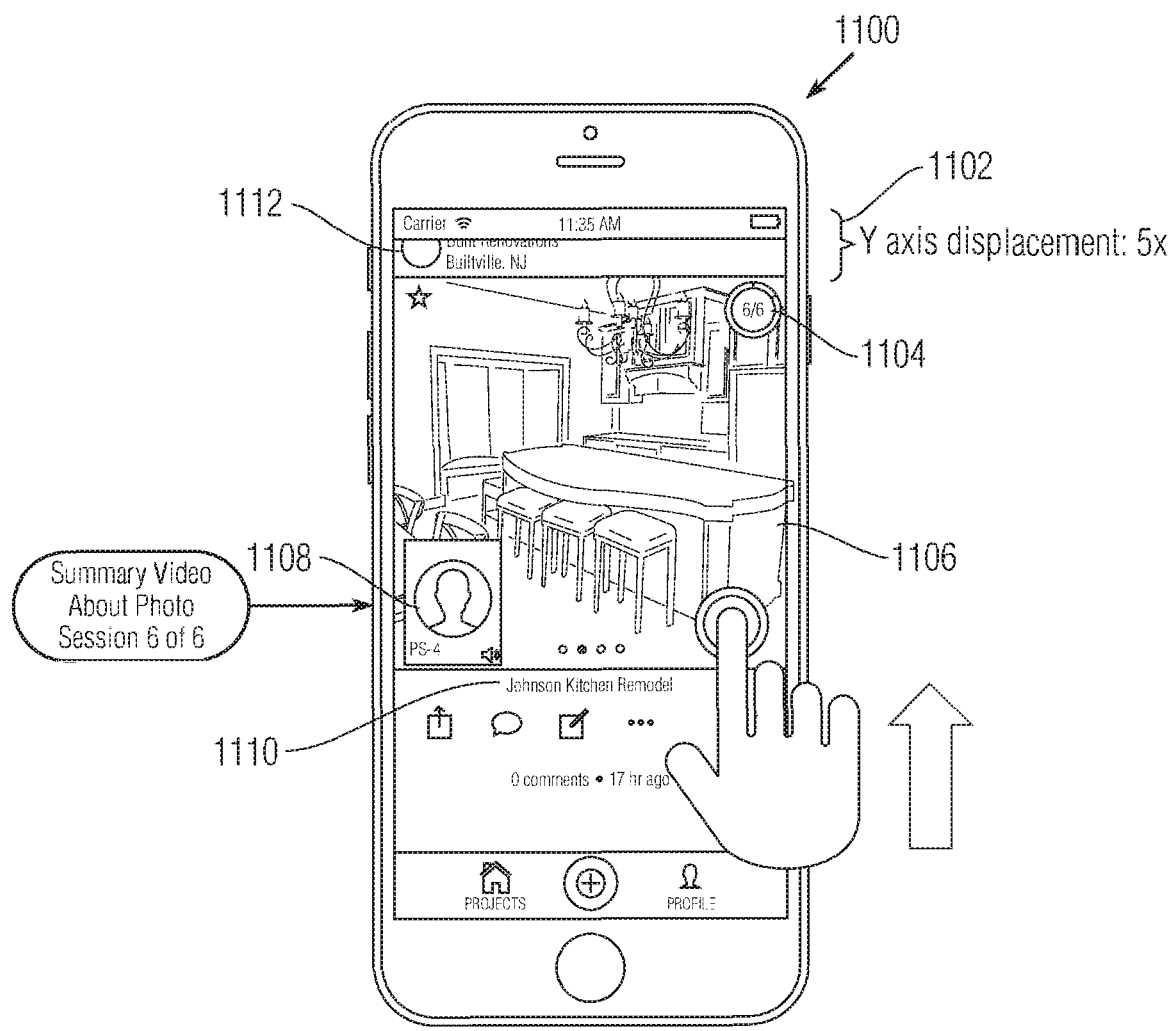

As shown in FIG. 11*c*, when a user makes an upward hand gesture, the image on the image viewport 1106 can be displaced by 1 unit, thus the next image or video in the cue can be displayed on the image viewport 1106. As a result, the second photo session (i.e., 2 of 6) is displayed. This process can continue until a user has reached the desired photo session. For example, FIG. 11*d* shows 3 of the 6 photo sessions, FIG. 11*e* shown photo session 4 of 6, FIG. 11*f* shows 4 of the 6 photo sessions, FIG. 11*g* shows 5 of the 6 photo sessions, and FIG. 11*h* shows 6 of the 6 photo sessions.

FIG. 12*a* is a diagram showing an exemplary user interface to change the active viewpoint with a displayed photo session. The image viewport 1202 can display the current photo session and viewpoint photo. The active viewpoint index can be incremented or decremented by an exemplary gesture, for example swiping left/right on a device 1200. The current selected viewpoint can be visually displayed on an indicator 1204.

Figure 12B:
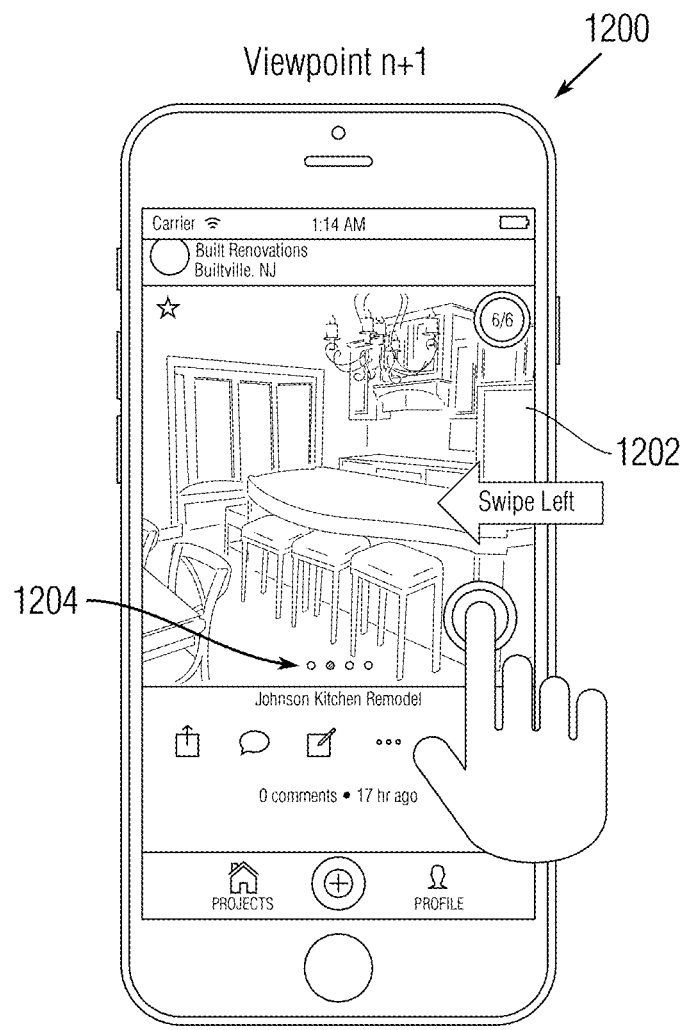
FIG. 12b is a screenshot showing a user interacting with an image scroll feed utilizing the ScrollSeek interface, changing the displayed viewpoint directive image for the current photo session, according to an example of the present disclosure.

FIG. 12*b* is a similar diagram to FIG. 12*a*, except in this example, the n+1 viewpoint is displayed and shown in the selected viewpoint visual indicator 1204 reflecting the selected viewpoint index.

An edge stencil image can require a need to align the new frame/photo with the ending frame/photo of the last time-lapse segment. Running an edge detection algorithm, an image of prominent edges is generated which is then overlaid over the camera viewfinder, allowing the user to line up the current photo/video capture with previous frame/photo. Space between the generated edges will be fully transparent to allow maximum clarity of the viewfinder video output. Edge color can also be updated on the fly, depending on the current viewfinder average color/brightness/hue to maximize contrast.

Time lapses require 2 or more photo frame captures. Alignment of the subject between frames is correlated with quality of overall result. Utilizing a mobile computer device which includes a camera sensor, a software application presents a graphical user interface consisting of a graphics view, displaying real-time video output of the camera sensor. In the case of the first frame being captured for this album, the user interface will just display unaltered video to the user. The user then initiates capture of photo via a user interface component, for example a button, touch gesture, or voice command. Once the camera sub components capture and process the image data, this data is then stored as a data structure associated with an encompassing data structure describing the time lapse album.

Upon initiating capture sequence of the 2nd-n frame, the system will retrieve one of the previously captured frames, or an aggregation of these previous frames via an algorithm which attains the most intended location of subject. Once this referential frame, or key frame, is located or generated, a computer algorithm processes the key frame, detecting edges, adding emphasis to prominent edges which most clearly outlines the subject. A possible example of this processes would begin by applying a grayscale filter, then a Sobel edge detection algorithm. To then create maximum transparency, filter any pixels that fall outside the range of the predefined line color. A fully transparent image with these lines is generated and made available to the photo capture software. This will be referred to as the edge key frame. The above image processing may occur at any time once a frame is captured and committed to a data structure. Processing may occur via a distributed system or locally on the mobile computer device.

Once the edge key frame is available, either via download or local generation, it is then displayed, at various transparency levels, over the real-time video output of the camera sensor. Its dimensions and location match the displayed camera viewfinder. The software may also adjust the color in which the lines of the edge key-frame are drawn. This color is calculated based on an algorithm taking into account the colors, brightness, hue or other image attribute displayed via the real-time camera image frame output, picking a color offering maximal contrast across the complete viewfinder output. In a further embodiment, the viewfinder image may be sectioned into any number of subsections, in which lines falling within this region have a line color calculated maximizing contrast of the camera output within this subsection. The subsection lines would then be drawn with the calculated subsection color. Each subsection would be drawn until the whole image is drawn. This all results in a clearly defined outline superimposed over the live preview allowing the user, via this user interface, to align the photo subject with previous frame captures with a high degree of accuracy. Upon alignment of the camera output with the edge key-frame outline, the user would initiate photo capture. Then software would then commit the resulting photo to data structure. This processes is then repeated until enough frames are captured, at the required gap time, to create the completed time-lapse.

It is to be understood that both the foregoing general description and the following detailed description are exemplary and explanatory only, and are intended to provide an explanation of various embodiments of the present teachings.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a device capable of creating a project portfolio and its many aspects, features and elements. Such a device can be dynamic in its use an operation, this disclosure is intended to encompass the equivalents, means, systems and methods of the use of the device and/or article of manufacture and its many aspects consistent with the description and spirit of the operations and functions disclosed herein. The claims of this application are likewise to be broadly construed.

This scope disclosure is to be broadly construed. It is intended that this disclosure disclose equivalents, means, systems and methods to achieve the communications, products, software, apps, functions, devices, activities, electronics, computers, systems and mechanical actions disclosed herein. For each functionality, software, method, computation, or executable program code disclosed, it is intended that this disclosure also encompass in its disclosure and teaches equivalents, means, systems and methods for practicing the many aspects of the methods, means, apparatus and articles disclosed herein. Such a technology can be dynamic in its use an operation, this disclosure is intended to encompass the equivalents, means, systems and methods of the use of the disclosed technology and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. An image capturing device for monitoring progress of a construction project, the image capturing device comprising:
   a user interface in a form of a screen,
   wherein the user interface allows a user to provide instructions regarding positioning and directing of the image capturing device to include at least one predetermined viewpoint that corresponds to an image of a location in a project area of the construction project, and
   wherein the instructions are in a form of at least one of: a voice, a text, or an image;
   a storage device configured to (i) store the instructions; and (ii) store a captured image; and
   a processor coupled to the storage device and programmed to retrieve the instructions from the storage device when requested by a user via the user interface and to create boundaries around key objects in the captured image,
   wherein the processor is configured, via the user interface, to:
   display an image of the at least one predetermined viewpoint in an overlay layer, or
   display an edge stencil within the overlay layer; and
   wherein the at least one predetermined viewpoint is stored in the storage device for use by the user at a future time to replicate the image of the location in the project area and the at least one predetermined viewpoint is used to provide a consistent context while allowing the user to browse progress of project change over time in the user interface; and
   wherein the processor is further configured, via the user interface, to:
   display a progression of the construction project in a form of time-based photo collages for before and after comparisons; and
   allow a user of the image capturing device to zoom into various parts of the construction project comprising time-based photo collages to view details, keeping an area of the image static while seeking through time based comparisons of specific objects or areas.

2. The image capturing device of claim 1, wherein when the instructions are in a form of the image, the image is at least one of a stencil image, a template photo, or an overlay image.

3. The image capturing device of claim 2, wherein when the instructions are in form of an overlay photo, the image capturing device comprises a controller to control an opacity of the overlay image.

4. The image capturing device of claim 1, wherein when the instructions are in a form of the text, the text is at least one of: directions to a location or a location coordinate.

5. The image capturing device of claim 1, further comprises an indicator to confirm the position of the image capturing device that includes the at least one predetermined viewpoint.

6. The image capturing device of claim 1, wherein when the image of the at least one predetermined viewpoint is not a first photo session for the construction project, the edge stencil is generated from a last captured image for a current viewpoint.

7. The image capturing device of claim 1, wherein the edge stencil comprises an image downloaded from a server.

8. The image capturing device of claim 1, wherein the edge stencil comprises an image generated based on a previously captured image that is locally stored in the image capturing device.

9. The image capturing device of claim 1, wherein the processor is further configured to compose a plurality of images captured at a plurality of locations in the construction project area to create a smooth progression of the construction project in a form of a time-lapsed video or photo collages for before and after comparisons.

10. A method of monitoring progress of a construction project via an image capturing device including a user interface by a user, the method comprising:
    generating a project entity comprising directions to a list of viewpoints and storing the project entity in a storage device;
    capturing at least an image at each viewpoint in the list of viewpoints, the at least an image at each viewpoint corresponding to an image of a location in an area of the construction project;
    storing the captured images in association with each viewpoint;
    providing an edge stencil image at each viewpoint;
    displaying an image of a viewpoint in an overlay layer, or displaying an edge stencil within the overlay layer;

indicating that the image is properly aligned with the edge stencil image, wherein each viewpoint is configured to be used by the user of the image capturing device at a future time to replicate the location of the captured image and provide a consistent context while allowing the user to browse progress of project change over time in the user interface; and allowing a user of the image capturing device to zoom into various parts of the construction project comprising time-based photo collages to view details, keeping an area of the image static while seeking through time based comparisons of specific objects or areas.

11. The method of claim 10, wherein the step of generating the project entity further comprises creating a project name.

12. The method of claim 10, further comprising transmitting the project entity to a web application programming interface platform.

13. The method of claim 12, comprising editing the project entity by adding an updated direction to at least a viewpoint in the list of viewpoints prior to transmitting the project entity to the web application programming interface platform.

14. The method of claim 13, comprising receiving the project entity and reconciling changes from the updated direction to a viewpoint list with platform's viewpoint project entity list.

15. The method of claim 10, comprising displaying attributes of each viewpoint.

* * * * *